United States Patent [19]
Tanaka

[11] Patent Number: 4,859,042
[45] Date of Patent: Aug. 22, 1989

[54] ZOOM LENS
[75] Inventor: Kazuo Tanaka, Tokyo, Japan
[73] Assignee: Canon Kabushiki Kaisha, Tokyo, Japan
[21] Appl. No.: 26,004
[22] Filed: Mar. 16, 1987
[30] Foreign Application Priority Data
  Mar. 17, 1986 [JP] Japan .................................. 61-058540
[51] Int. Cl.$^4$ ......................... G02B 9/64; G02B 15/14
[52] U.S. Cl. ..................................... 350/423; 350/427
[58] Field of Search ................................. 350/423, 427
[56] References Cited
  U.S. PATENT DOCUMENTS
  3,501,224  3/1970  Takahashi ........................... 350/427
  4,073,573  2/1978  Yamagishi .
  4,256,381  3/1981  Kreitzer .
  4,701,034  10/1987  Mihara ................................. 350/427

Primary Examiner—Rodney B. Bovernick
Assistant Examiner—Rebecca D. Gass
Attorney, Agent, or Firm—Fitzpatrick, Cella, Harper, & Scinto

[57] ABSTRACT

A zoom lens comprising, from front to rear, a first lens group having a positive refractive power and fixed relative to an optical axis, a second lens group having a negative refractive power, a third lens group fixed relative to the optical axis and having a positive refractive power, and a fourth lens group having a positive refractive power, the second and fourth lens groups being axially moved to effect zooming, and the fourth lens group being also made to axially move to effect focusing.

6 Claims, 25 Drawing Sheets

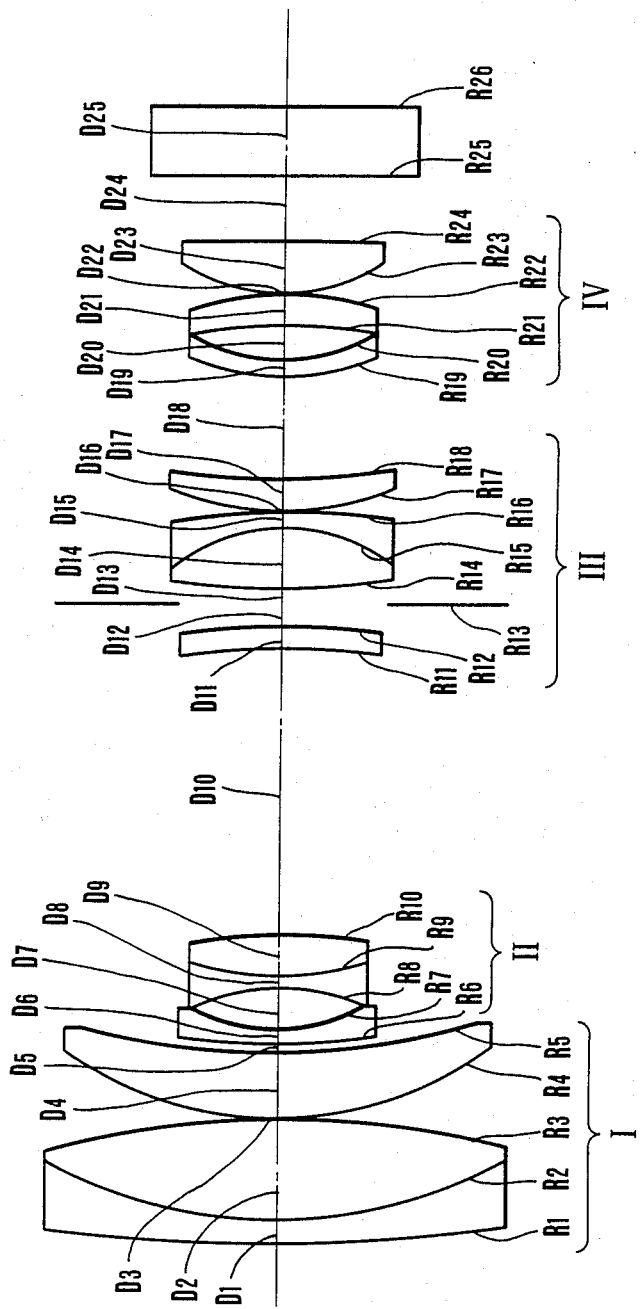
F I G. 3

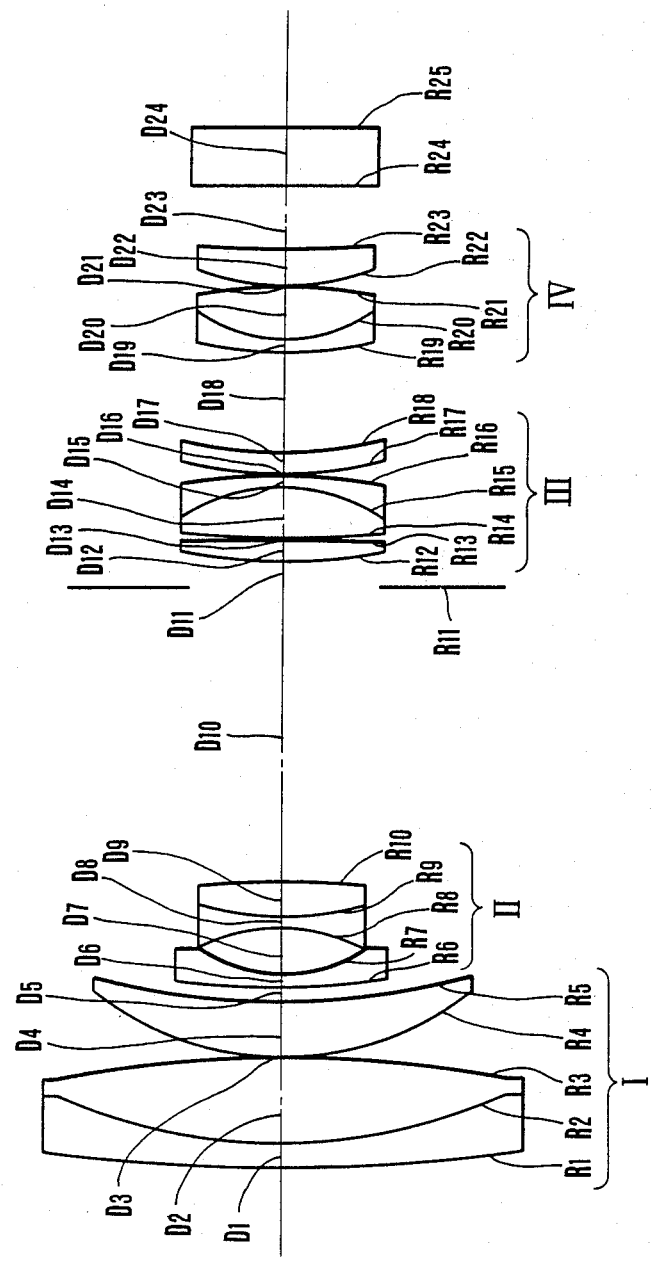
F I G. 5

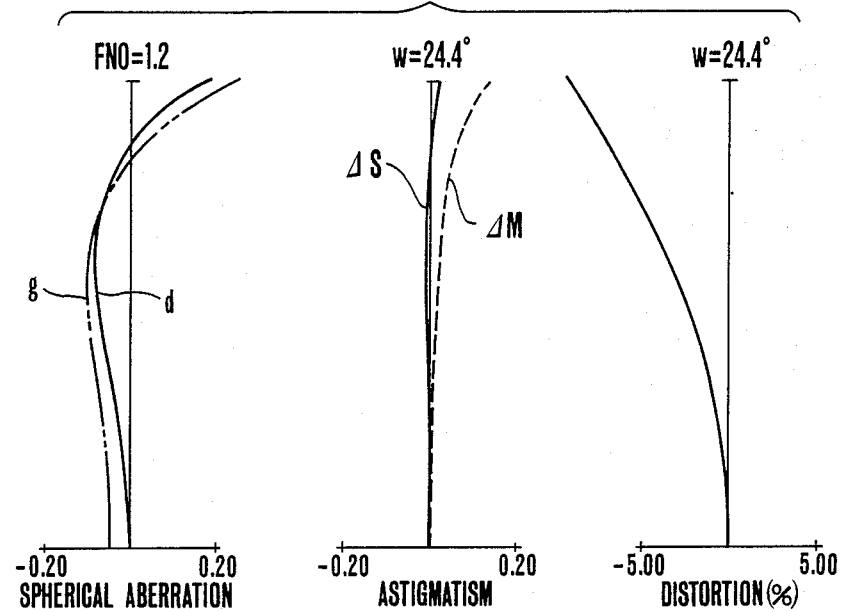
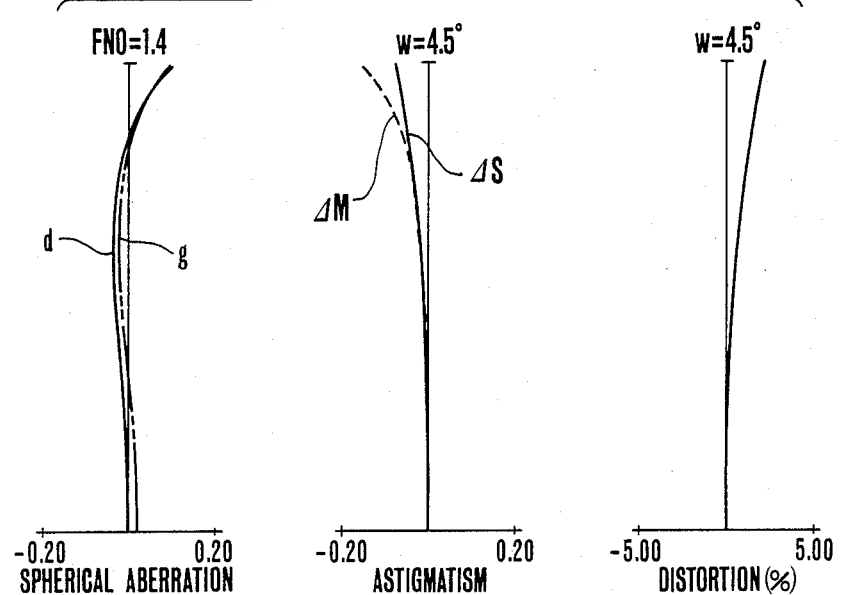

ZOOM LENS

BACKGROUND OF THE INVENTION

1. Field of the Invention

This invention relates to zoom lenses, and more particularly to high range, large relative aperture zoom lenses employing the rear focus method suited to still cameras, video cameras, or TV cameras for broadcast.

2. Description of the Related Art

In the past, as zoom lenses of relatively high zoom ratio with large relative aperture used in the still cameras or video cameras, there is the so-called 4-unit zoom lens. This 4-unit zoom lens comprises, from front to rear, a first lens unit or group for focusing, a second lens unit or group for varying the image magnification, a third lens unit or group for compensating for image shift resulting from the variation of the image magnification, and a fourth lens unit or group for adjusting the focal lengths of the entire system and balancing correction of aberrations. In the 4-unit zoom lens, there are arranged two lens units or groups for zooming and one lens unit or group for focusing, totalling three lens units or groups made axially movable. For this reason, the structure of construction of the lens mounting tended to become relatively complicated. Also, because focusing down to shorter object distances is performed by moving the first lens unit or group frontward, for a sufficient off-axis light beam is secured, the diameter of the front lens units or group tended to increase.

From these reasons, a variety of zoom lenses in which the focusing provision is made in other than the first lens unit or group, or employing the so-called rear focus method have been proposed.

For example, in U.S. Pat. No. 4,364,642, for a 4-unit zoom lens, the third lens unit or group is made movable for focusing. In U.S. Pat. No. 4,460,251, also for a 4-unit zoom lens, the second and third lens units or groups are made to move as a unit or group when focusing is performed. Also, Japanese Laid Open Patent Application No. Sho 58-136012 proposes a zoom lens whose the zooming section is constructed with three or more lens units or groups, and whose focusing is performed by moving part of the zoom units or groups. However, these zoom lenses, though each having its front lens unit or group reduced in diameter, get a feature that the locus of movement of the focusing lens unit differs largely between an infinitely distant object and a close object. Therefore, a spare space must previously be secured in the lens system. So the total length of the zoom lens tended to increase. Another method is that the fourth lens unit or group of the 4-unit zoom lens is divided into two parts, one of which is made movable for focusing, as disclosed in Japanese Laid Open Utility Model No. Sho 59-63314. However, in this zoom, lens, because the total sum of movable lens units or groups amounts up to 3, the complexity of structure of the lens mounting mechanism tended to increase.

SUMMARY OF THE INVENTION

An object of the invention is to provide a zoom lens of high magnification range with a large relative aperture employing the rear focus method, which is constructed in simple form to achieve a minimization of the size of the entire lens system.

And, to achieve this object, in application to the zoom lens comprising, from front to rear, a first lens unit or group of positive refractive power, a second lens unit or group of negative refractive power, a third lens unit or group of positive refractive power, and a fourth lens unit or group of positive refractive power, the first and third lens units or groups are made fixed, the second lens unit or group is made to move in one direction to vary the image magnification, the fourth lens unit or group is made to move so as to compensate for the shift of the image plane accompanying with the change of the image magnification, and focusing is performed by moving the fourth lens unit or group while holding the second lens unit or group stationary.

This and other objects and features of the invention will become apparent in embodiments thereof and the drawings.

BRIEF DESCRIPTION OF THE DRAWINGS

FIGS. 1, 3, 5, 7, 9, 11, 13, 15, 17, 20, 21 and 22 are sectional views of numerical examples 1-12 of lenses of the invention respectively.

FIGS. 2(B), 4(B), 6(B), 8(B), 10(B), 12(B), 14(B), 16(B), 18(B), 23(B), 24(B) and 25(B) are graphic representations of the various aberrations of the numerical examples 1-12 respectively at the telephoto side.

In these figures, d is the d-line, g is the g-line, M is the meridional image surface, S is the sagittal image surface, I, II, III and IV are respectively the first, second, third and fourth lens units or groups.

DETAILED DESCRIPTION OF THE PREFERRED EMBODIMENTS

Figure 1:
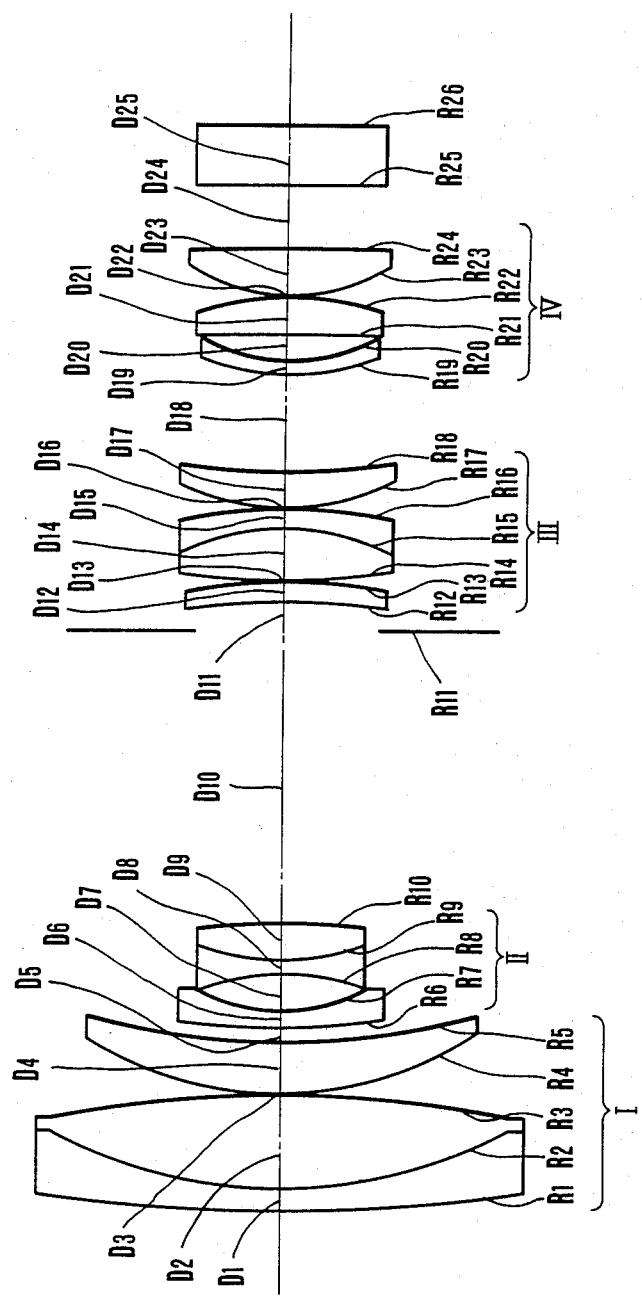
Figure 2:
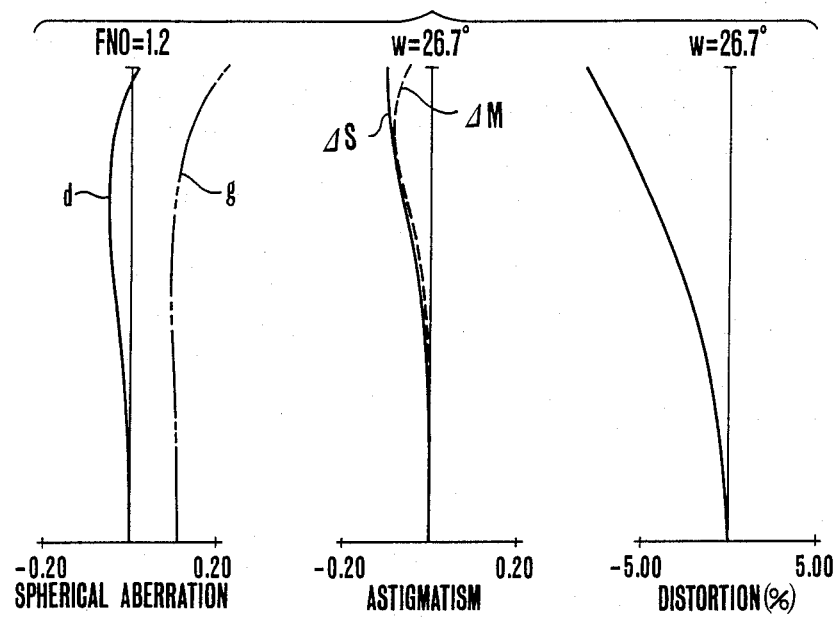
FIGS. 2 (A), 4(A), 6(A), 8(A), 10(A), 12(A), 14(A), 16(A), 18(A), 23(A), 24(A) and 25(A) are graphic representations of the various aberrations of the numerical examples 1-12 respectively at the wide angle side.
Figure 2:
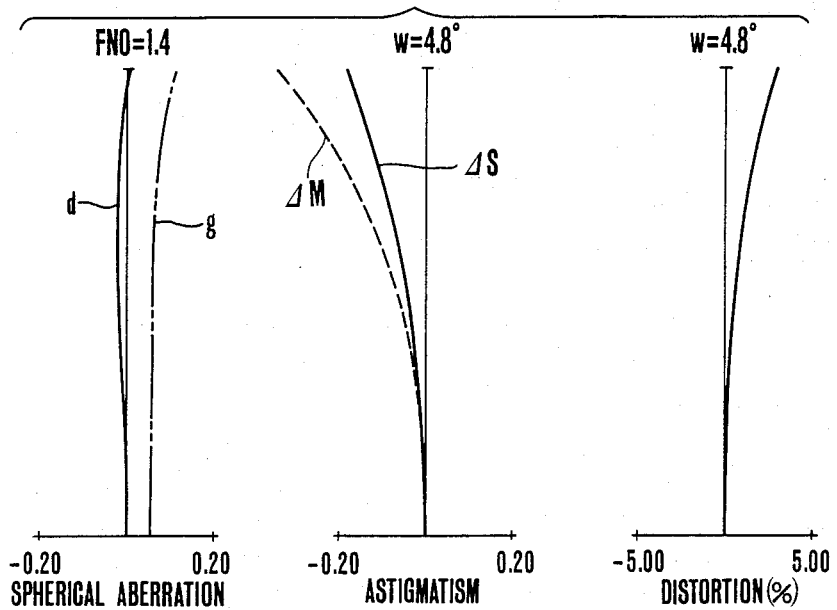
Figure 4:
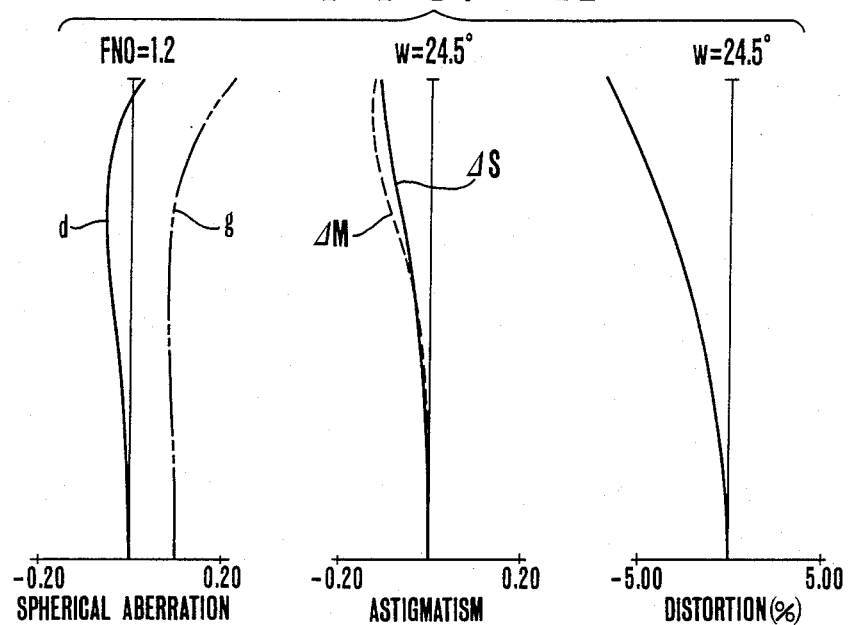
Figure 4:
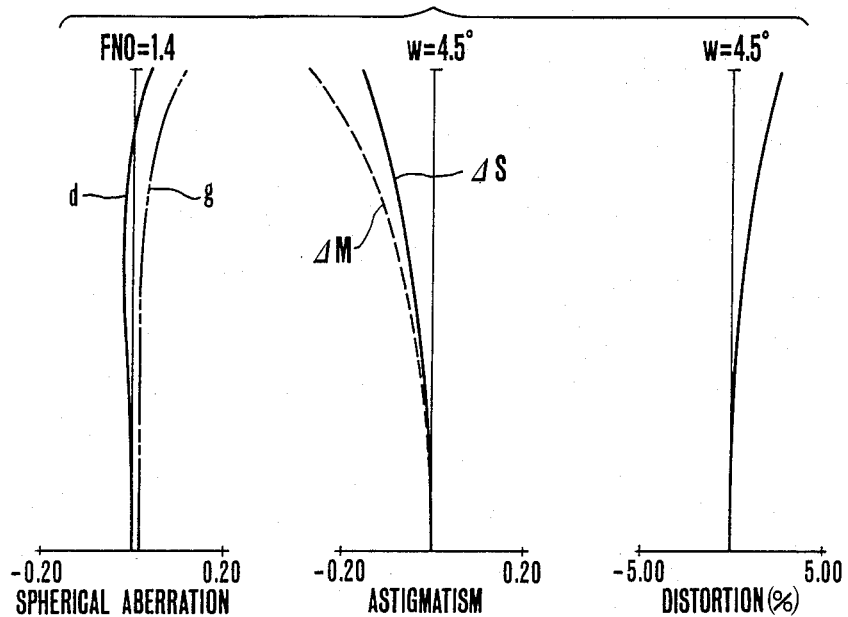
Figure 6:
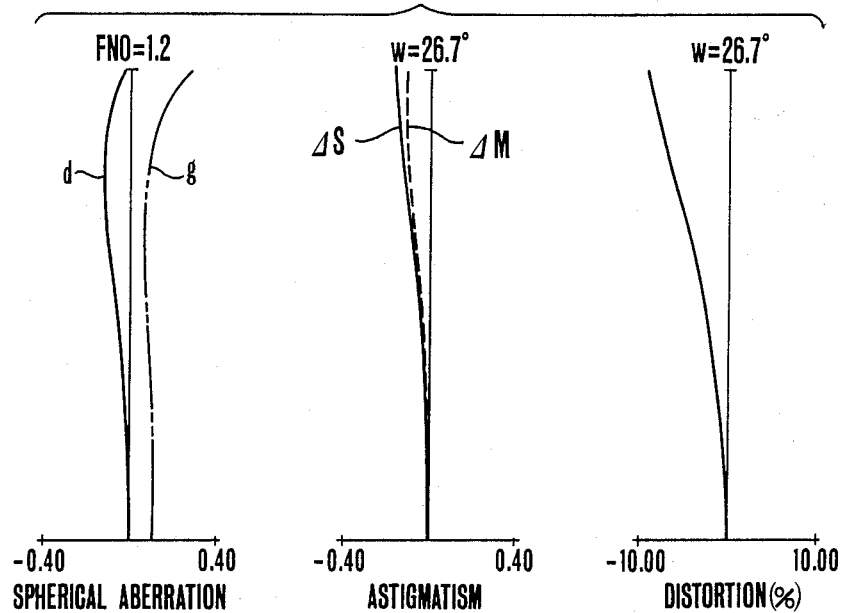
Figure 6:
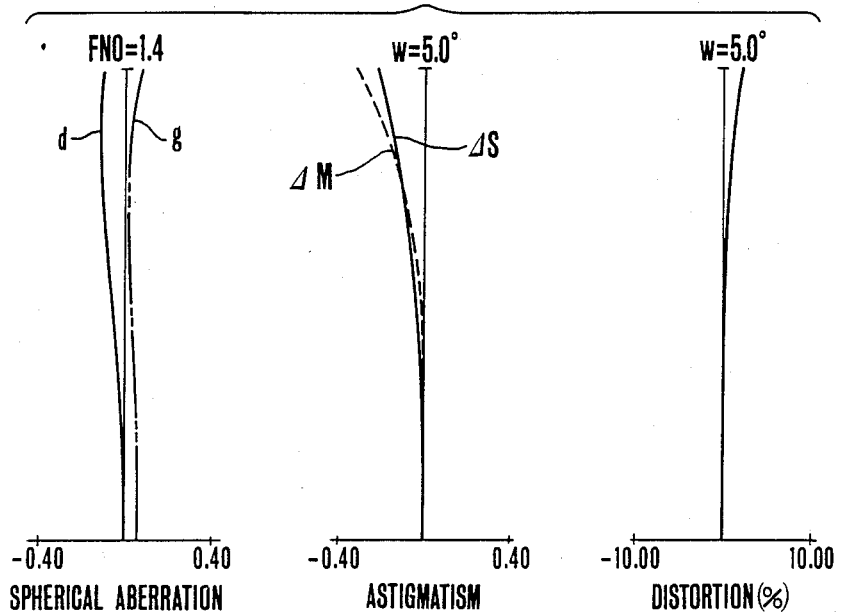
Figure 7:
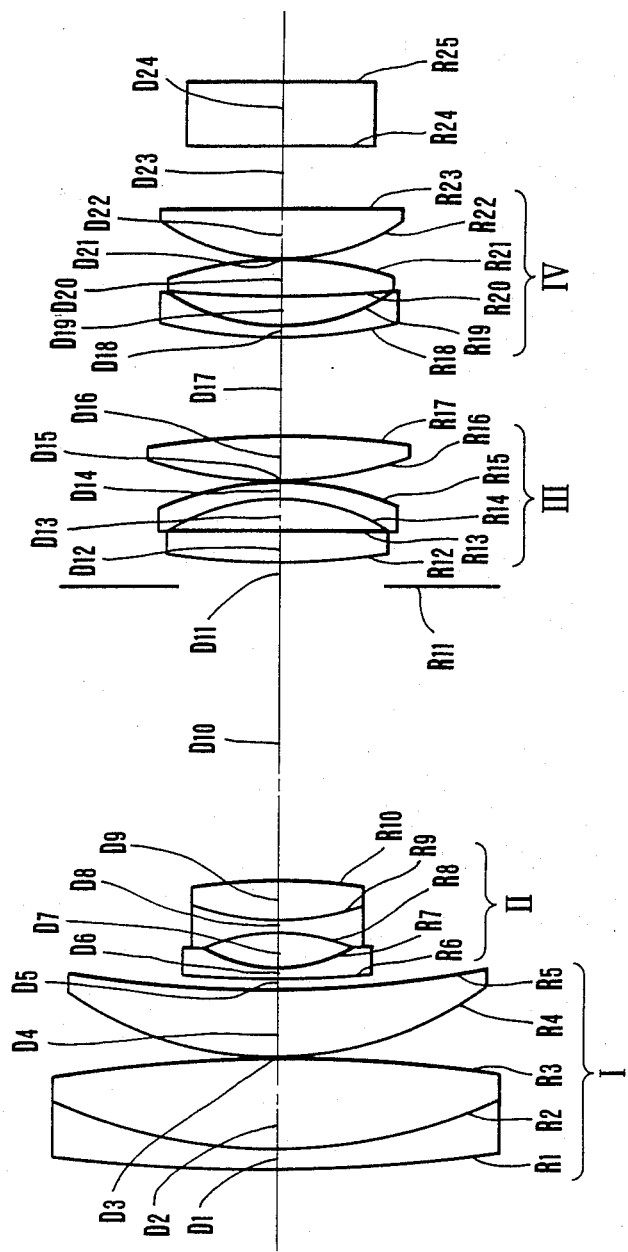
Figure 8:
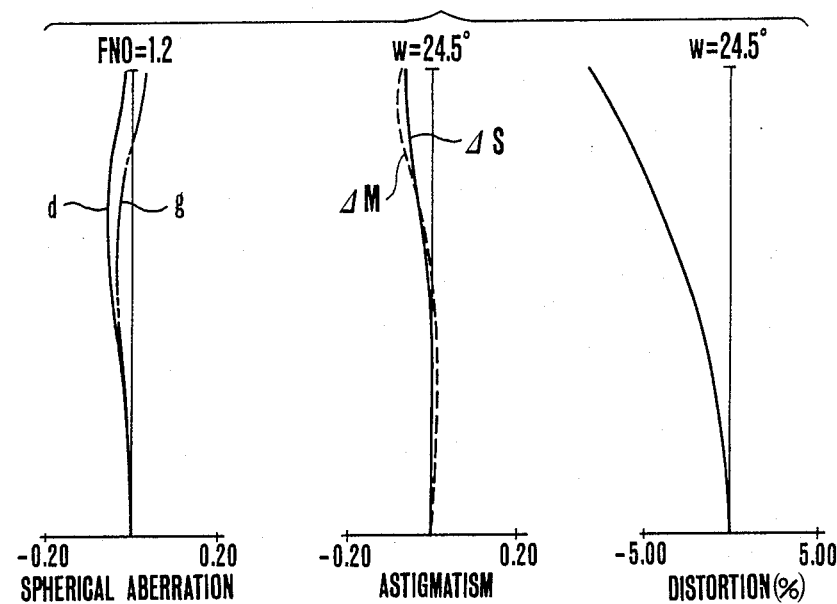
Figure 8:
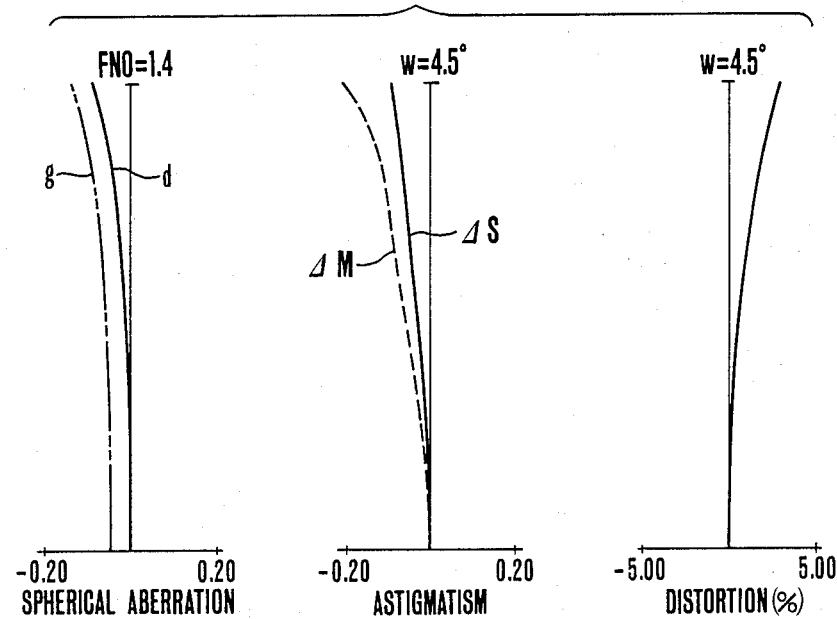
Figure 9:
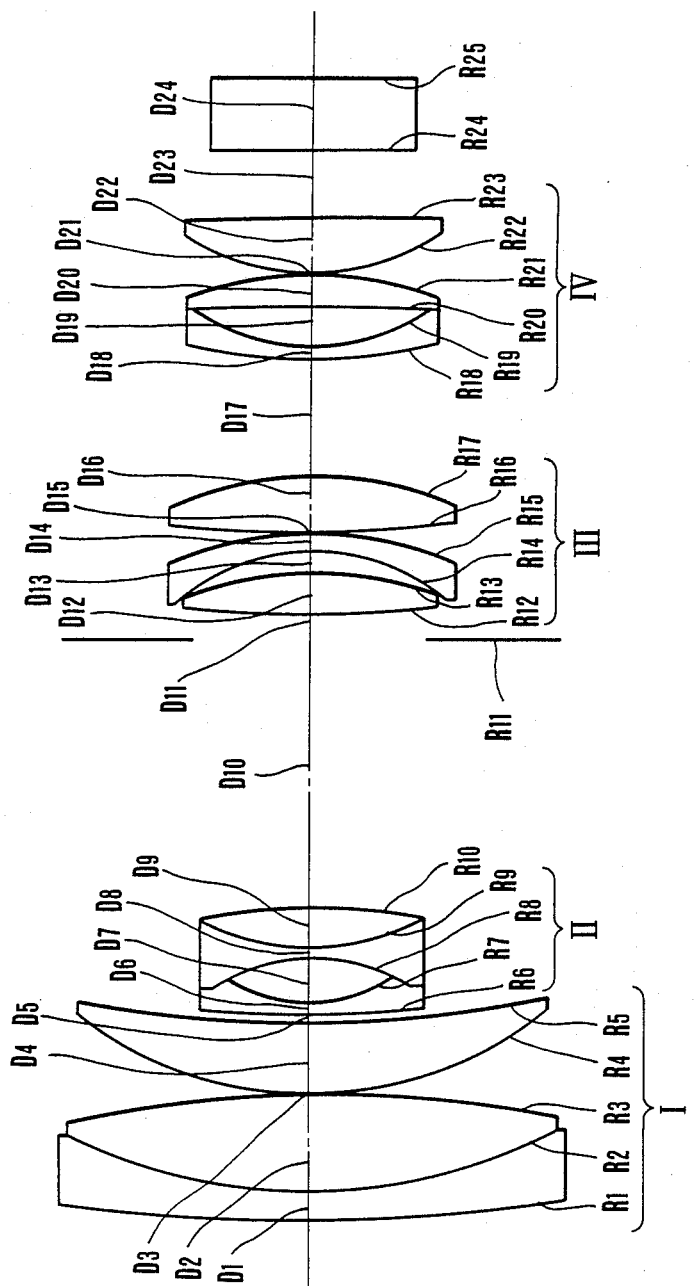
Figure 11:
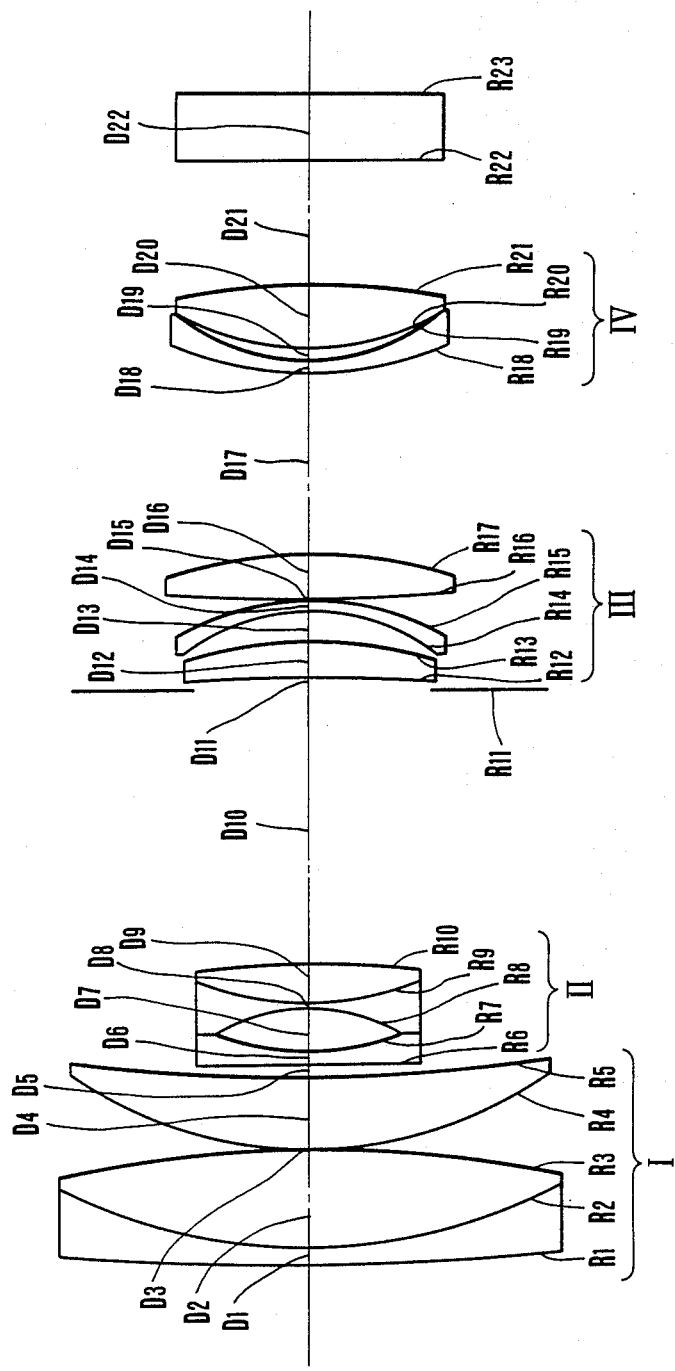
Figure 12:
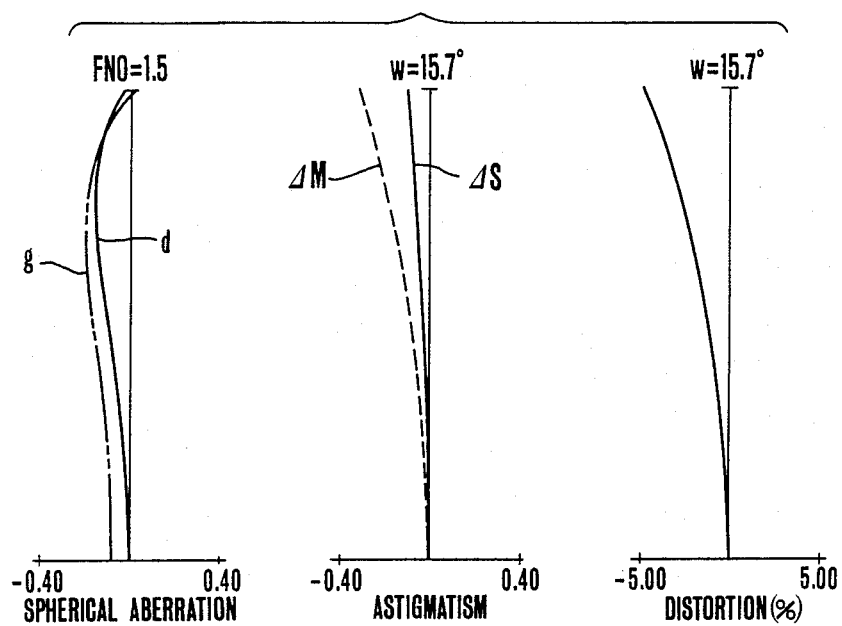
Figure 12:
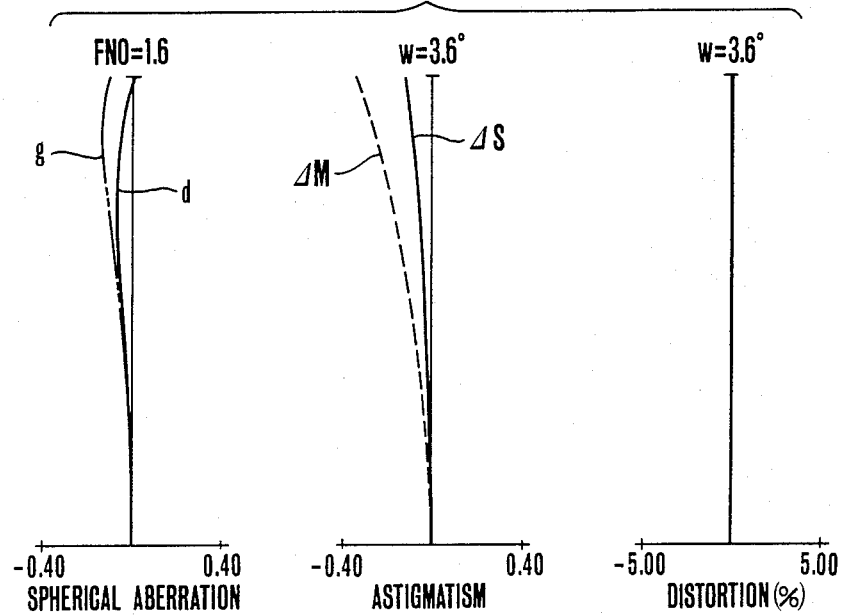
Figure 13:
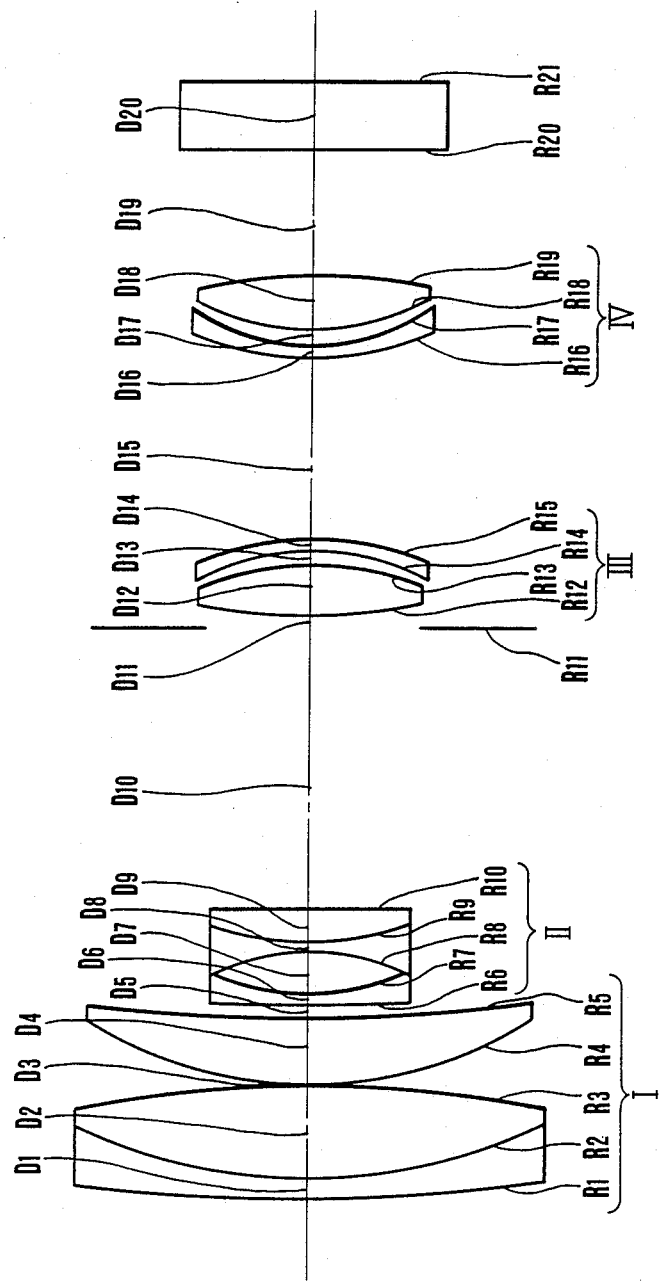
Figure 14:
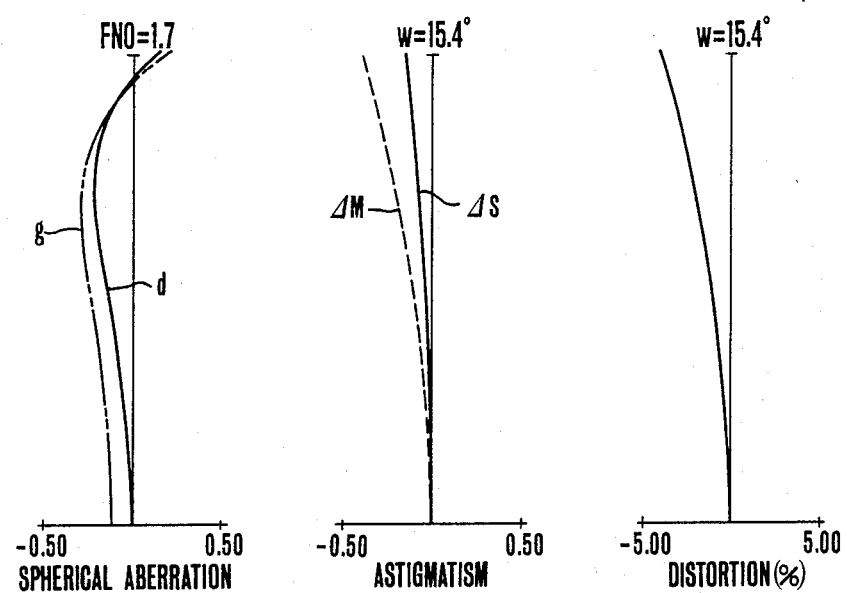
Figure 14:
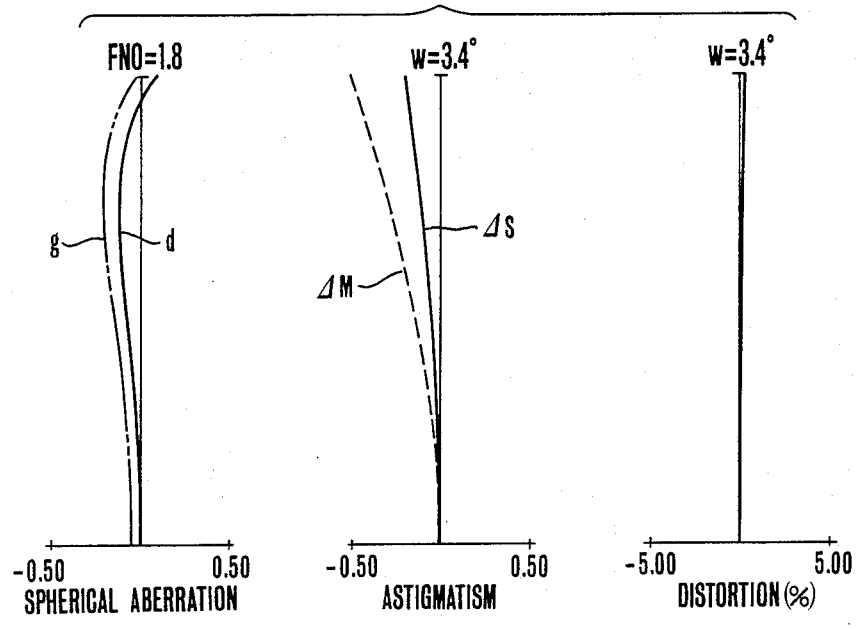
Figure 15:
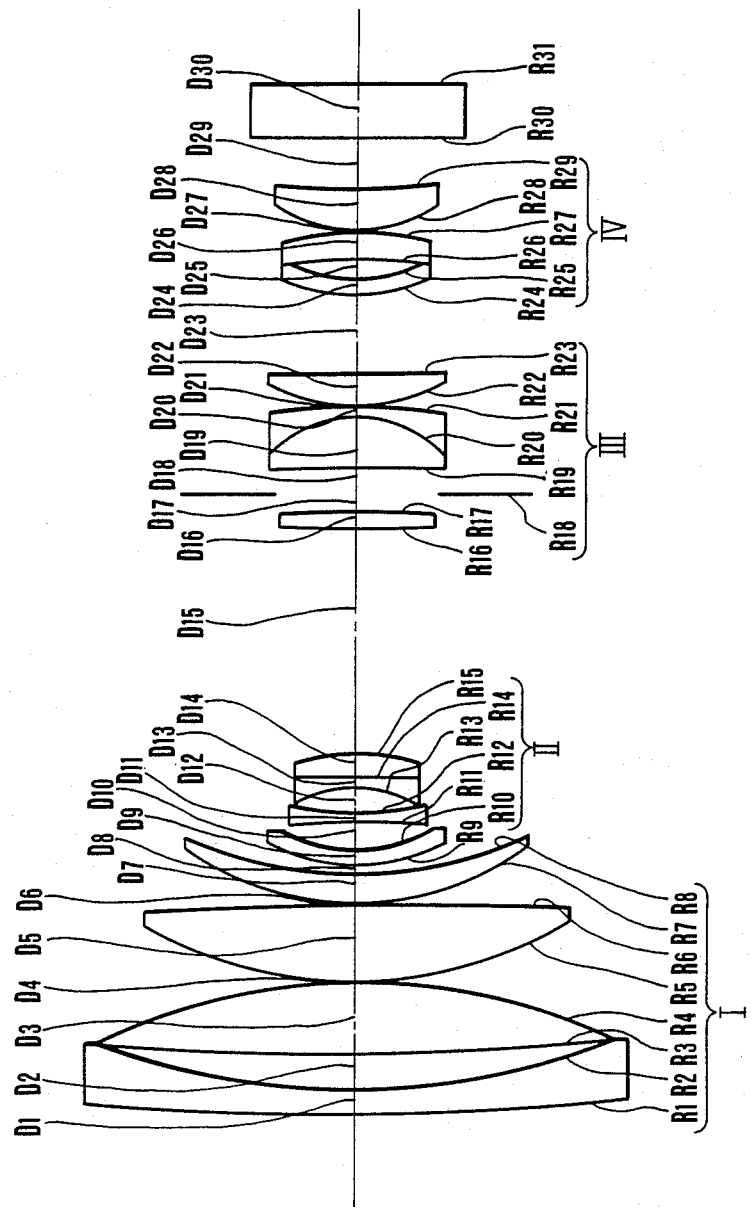
Figure 16:
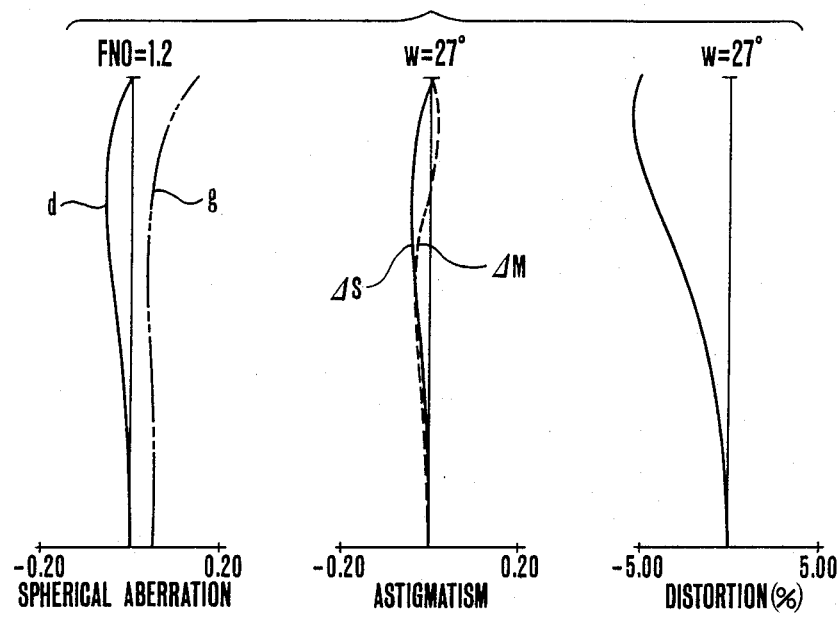
Figure 16:
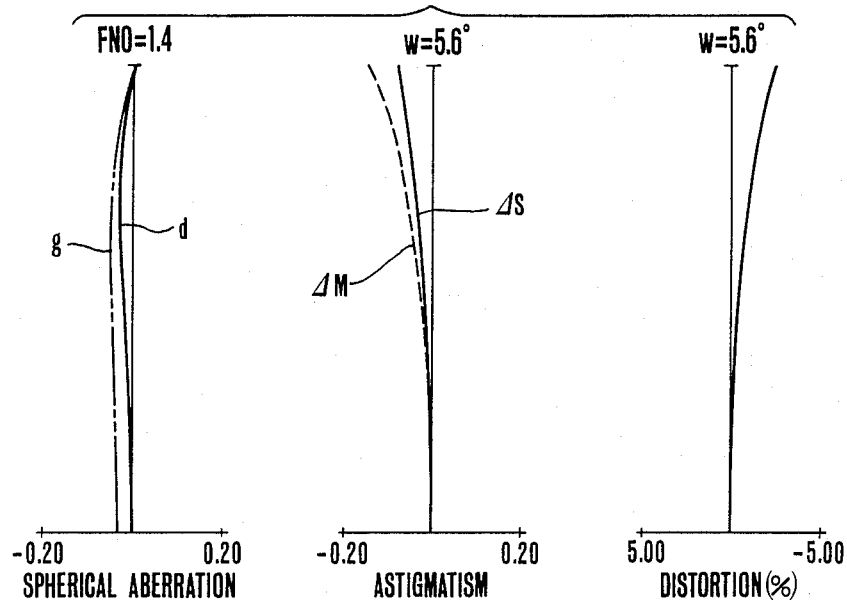
Figure 17:
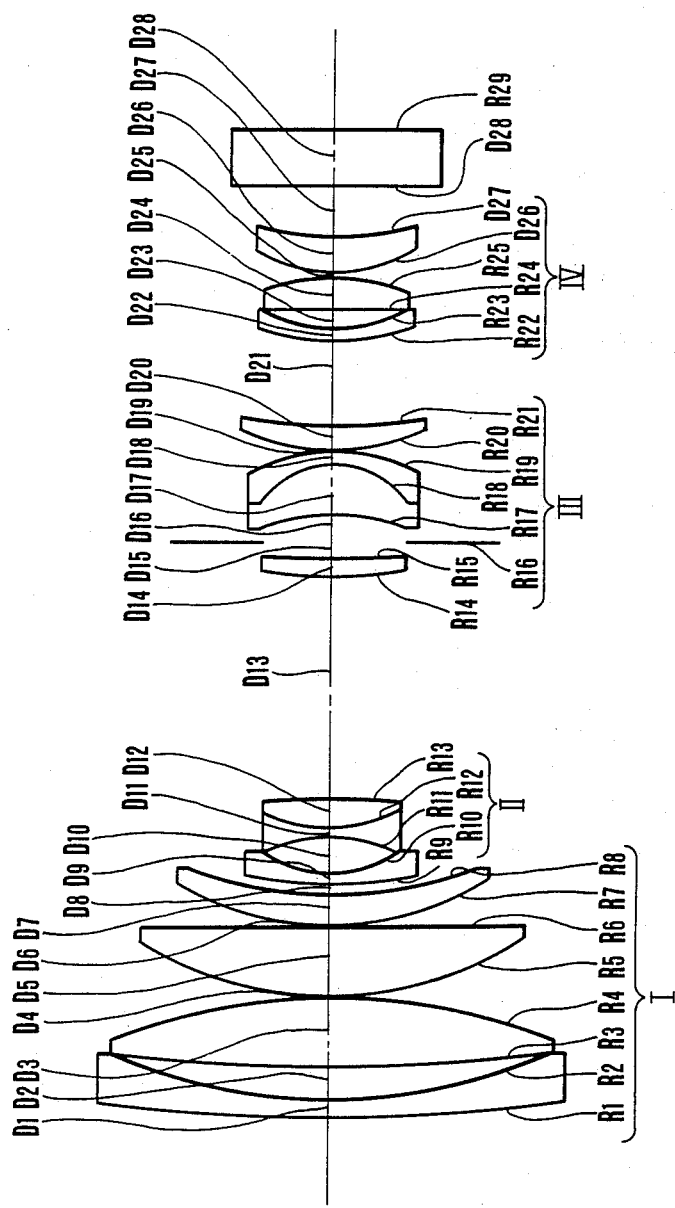
Figure 18:
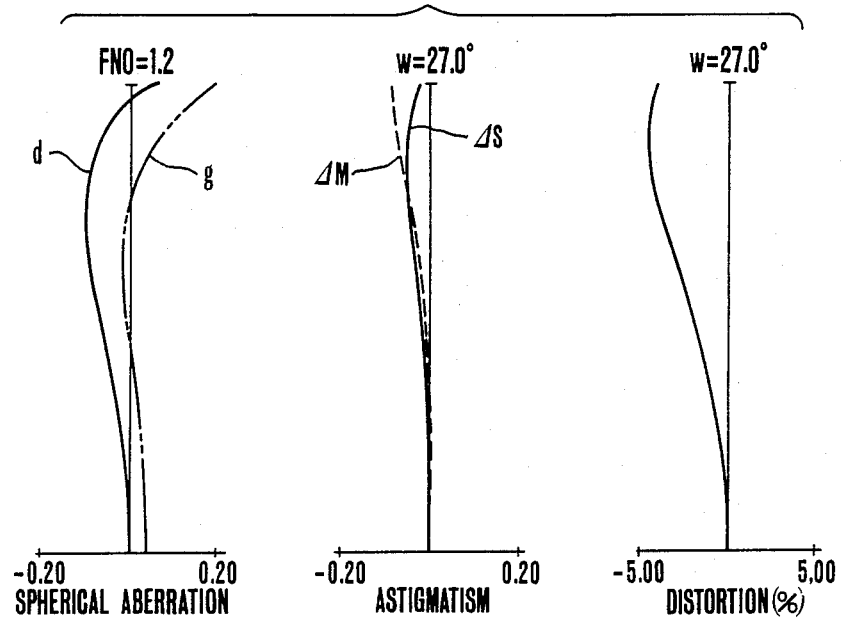
Figure 18:
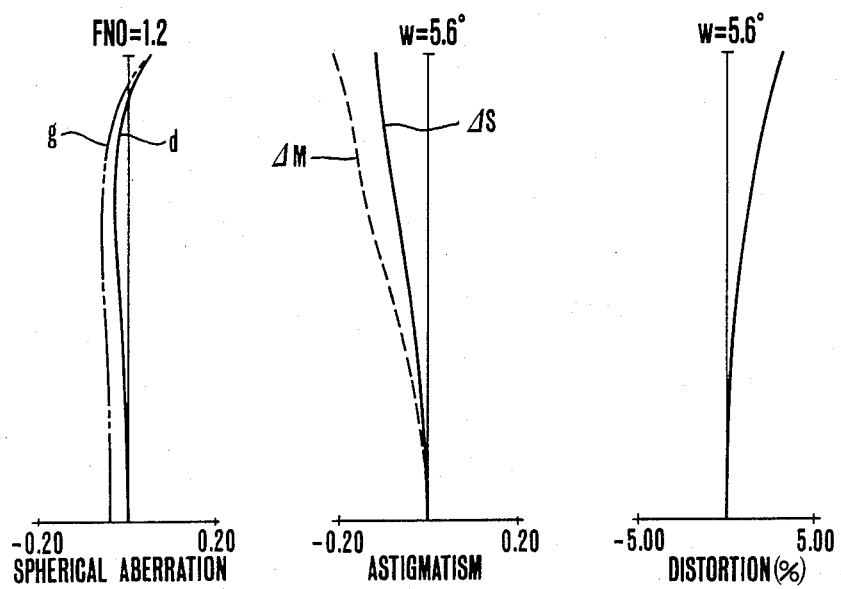
Figure 19:
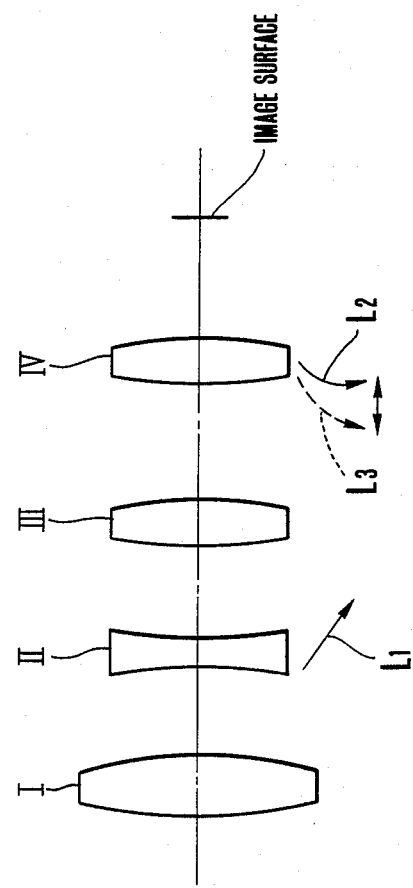
FIG. 19 is a schematic diagram of the fundamental structure of the invention.
Figure 20:
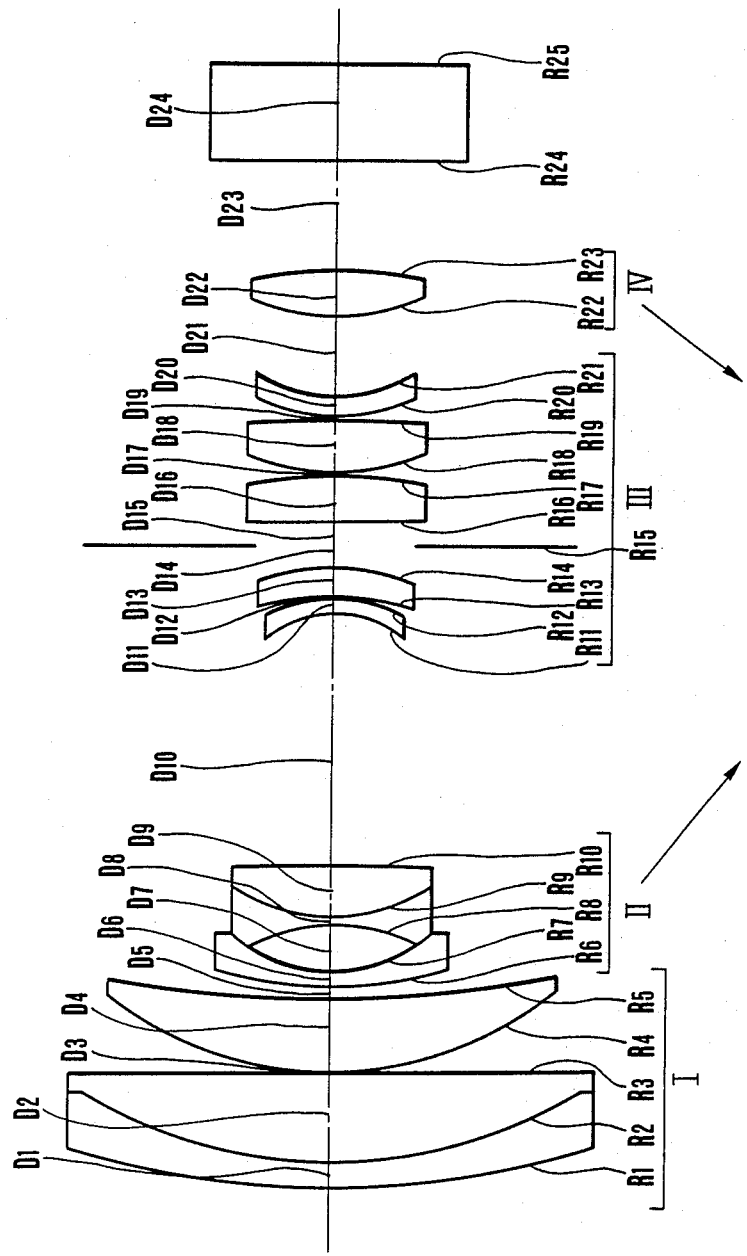
Figure 21:
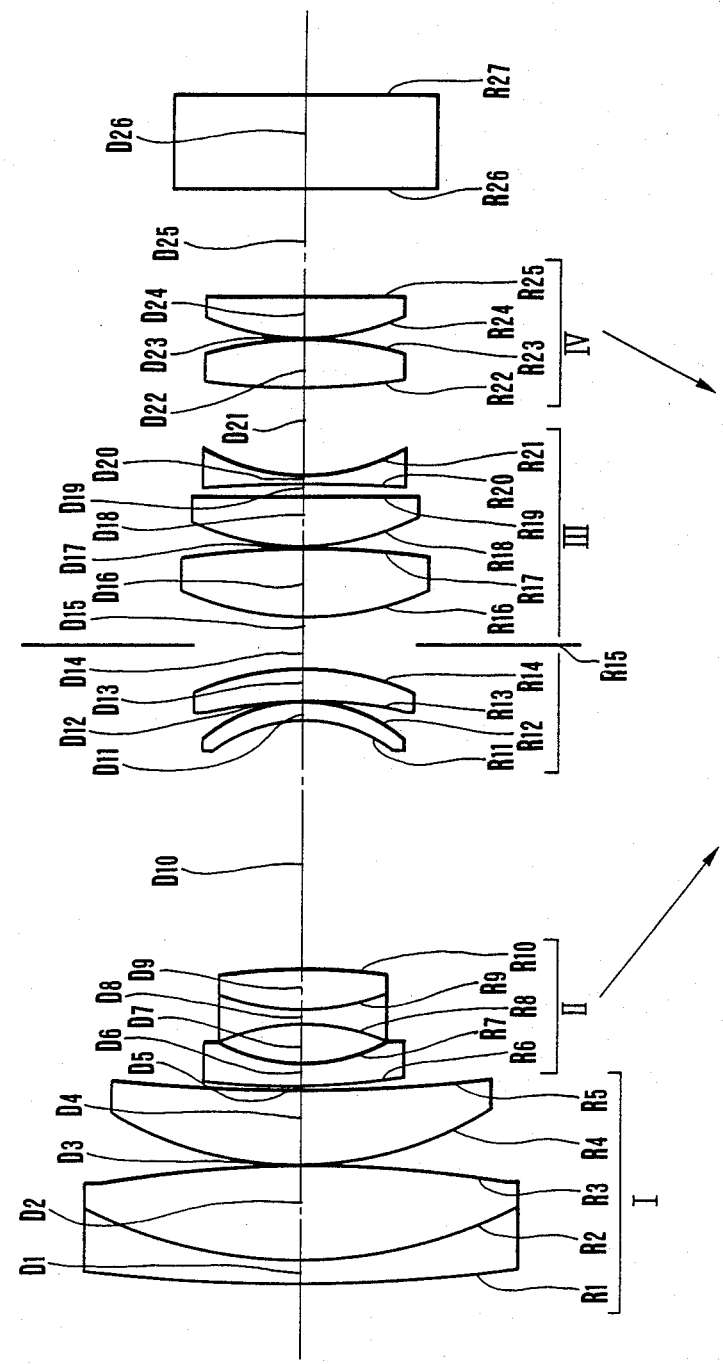
Figure 22:
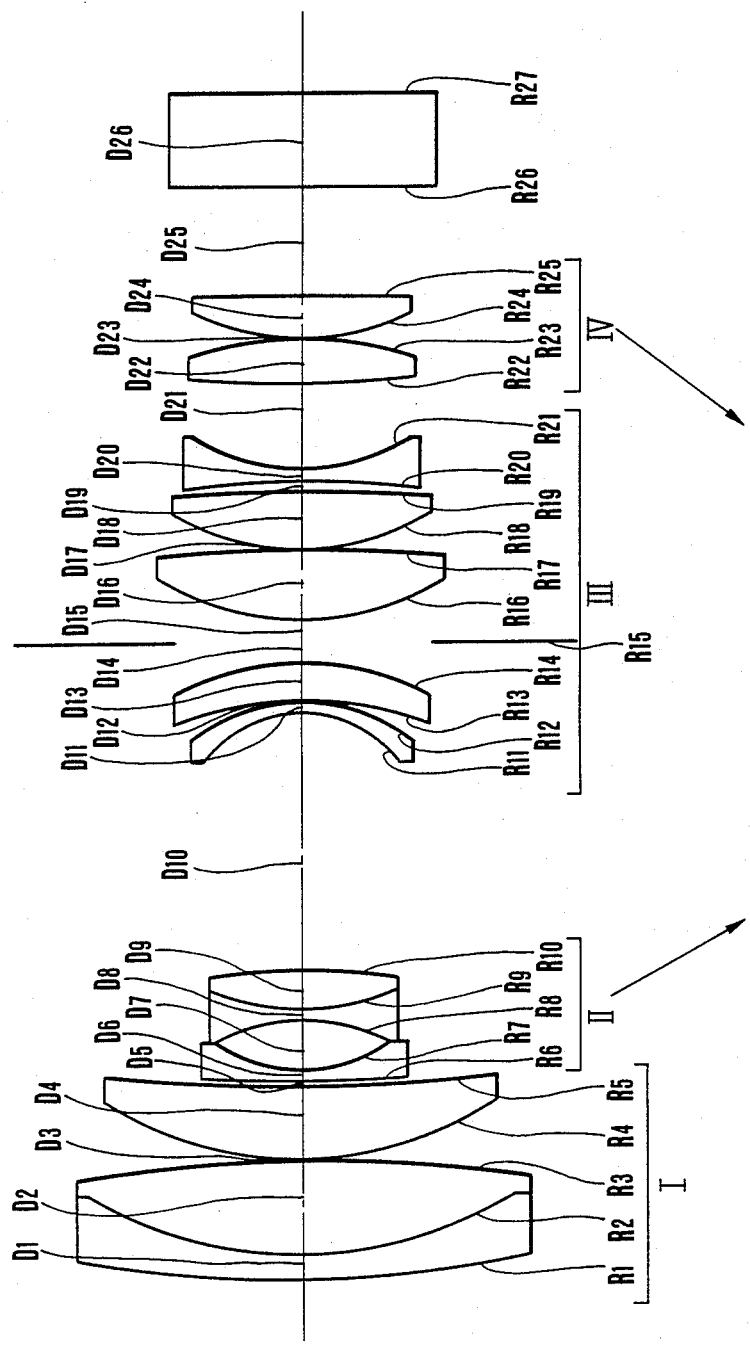
Figure 23:
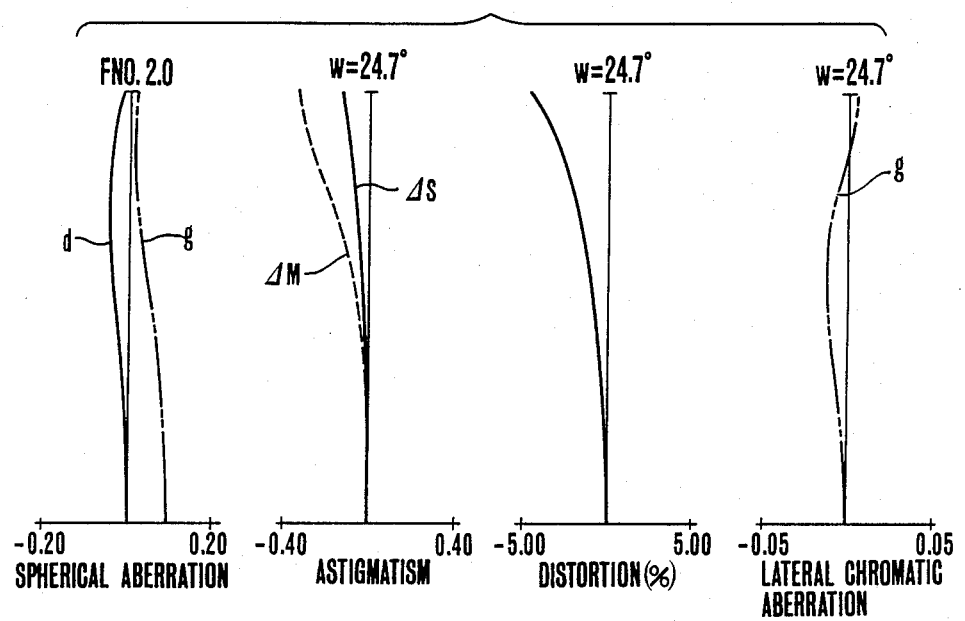
Figure 23:
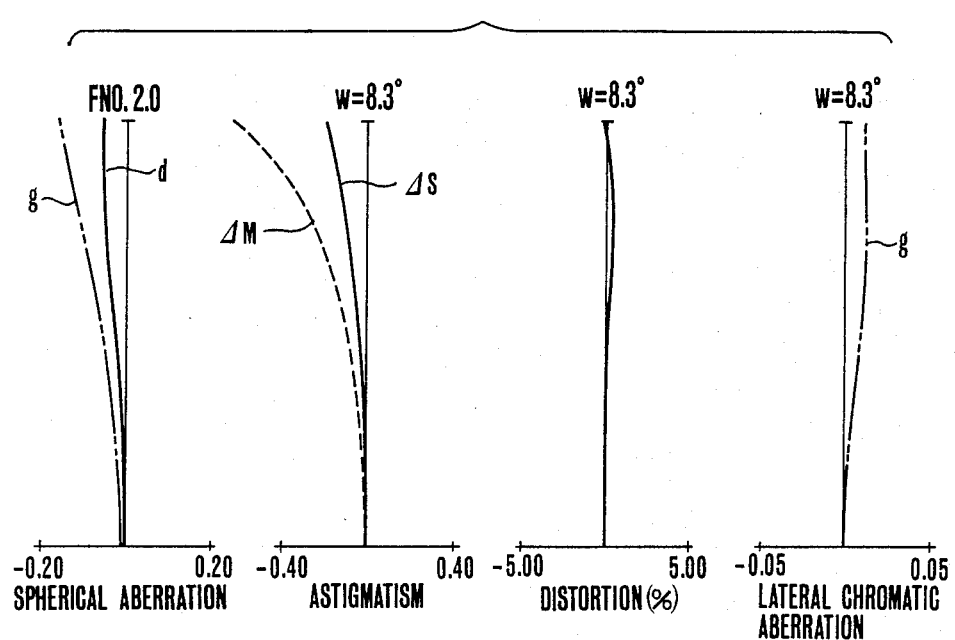
Figure 24:
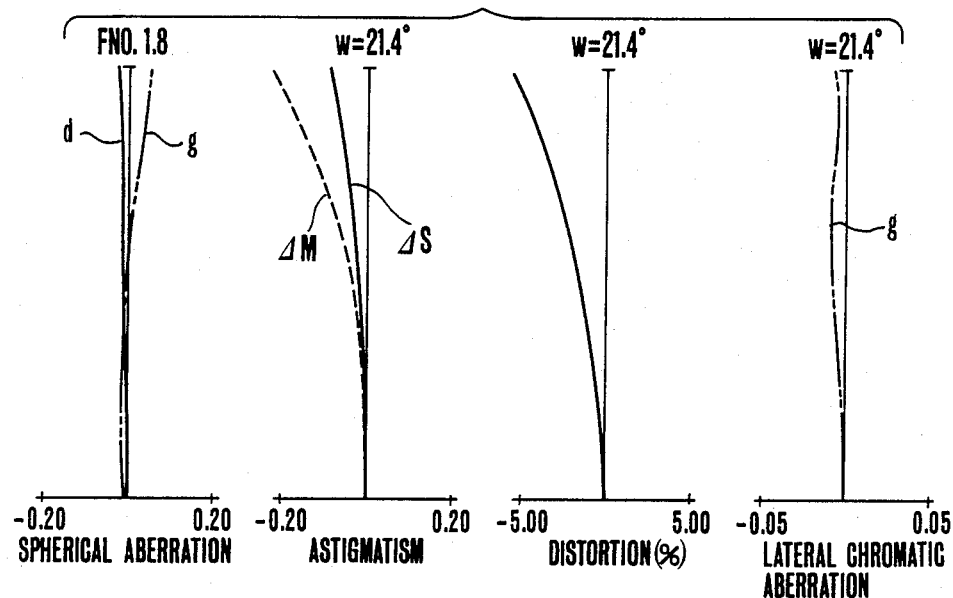
Figure 24:
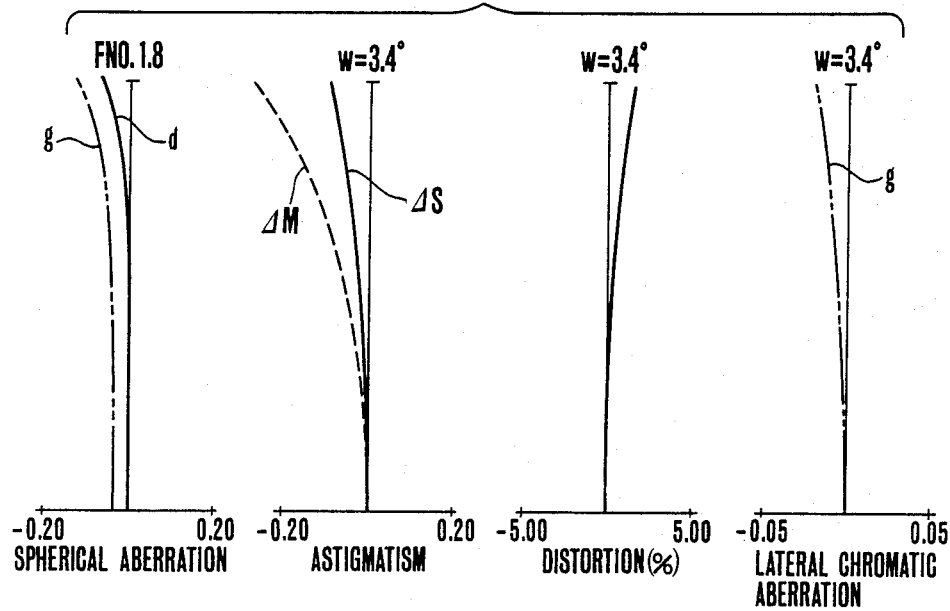
Figure 25A:
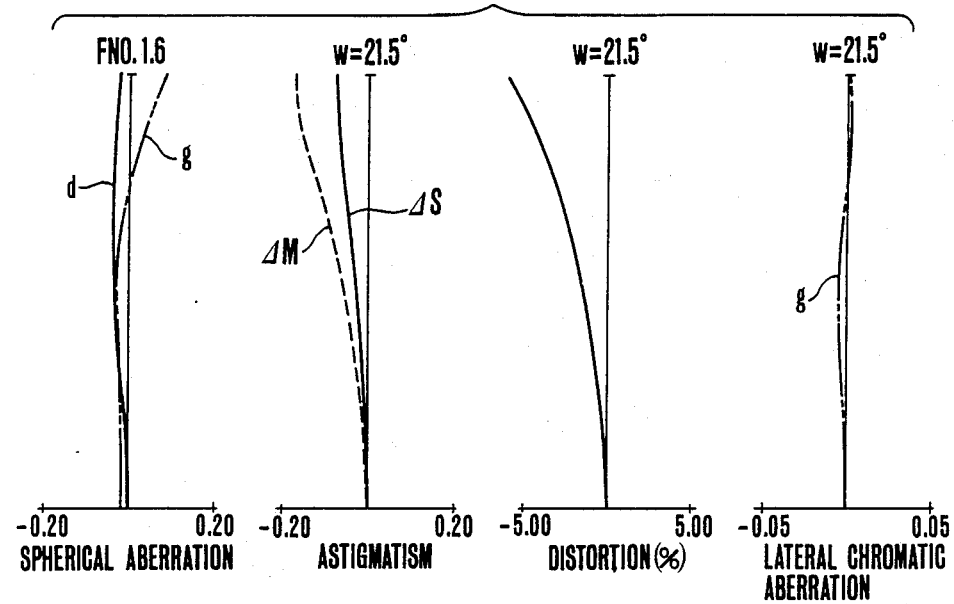
Figure 25B:
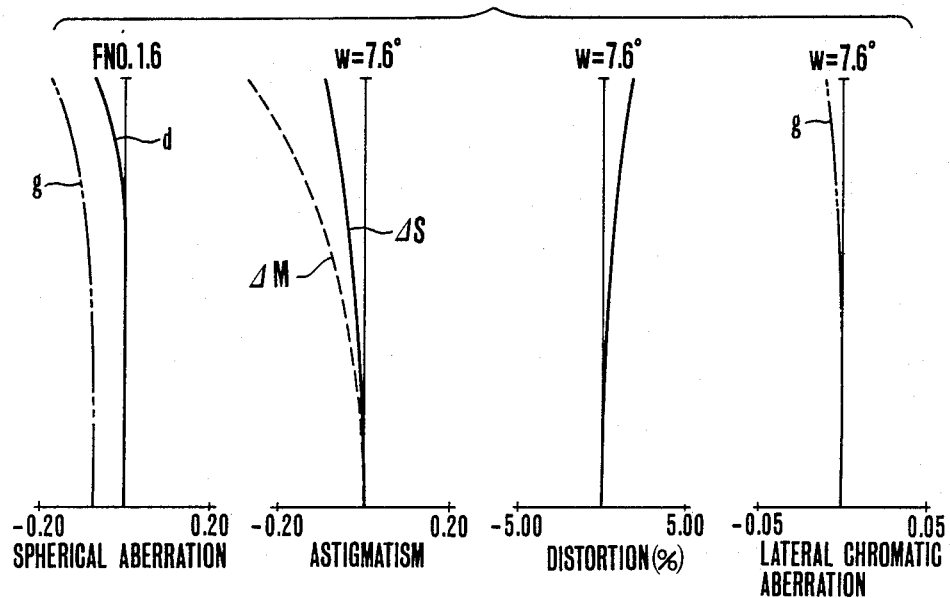

At first in FIG. 19 the fundamental structure of the optical system of an embodiment of the invention is geometrically shown. In this figure, I is the first lens unit or group of positive refractive power, II is the second lens unit or group of negative refractive power, III is the third lens unit or group of positive refractive power, and IV is the fourth lens unit or group of positive refractive power. Variation of the image magnification is performed by moving the second and fourth lens units or groups along loci shown by arrows $L_1$ and $L_2$ respectively. Of these, the second lens unit or group mainly performs variation of the image magnification, and the fourth lens unit or group compensates for the shift of an image plane accompanying with the variation of the image magnification.

And, further, focusing is performed by moving the fourth lens unit or group as shown by a two-headed arrow. For note, the first and third lens units or groups are fixed when zooming and focusing. The second lens unit or group is fixed when focusing.

In the present embodiment, by moving the second lens group of negative refractive power arranged between the first lens group of positive refractive power and the third lens group corresponding to the relay lens unit in one direction, variation of the image magnification is performed along with the imaging powers of the first and third lens groups with good efficiency. By making the fourth lens group to move toward the third lens group non-linearly as shown in the same figure when varying the image magnification, the shift of the image plane is compensated for, and an effective utilization of the space between the third and fourth lens groups is achieved to achieve a shortening of the total length of the lens.

In the present embodiment, when focusing, the first lens group is not moved forward, but made always fixed to prevent the diameter of the first lens group from being increased, since this would otherwise be caused by its forward movement. When focusing, instead of the first lens group, the fourth lens group which is part of the magnification varying system is made to move. Thereby the total number of movable lens groups is reduced to achieve simplicity on the mechanism and minimization of the size of the entire lens system. In other words, by making the fourth lens group to move within the space between the third and fourth lens groups while being let to have both functions of varying the magnification and focusing, an effective utilization of the space in the lens system is achieved to achieve a shortening of the total length of the lens.

For note, by the first and third lens groups, the various paraxial variables such as the focal length and image angle of the entire system and the back focus are adjusted, and variation of aberrations due to the variable lens groups is corrected well. Also, it is preferred in the present embodiment that a diaphragm is arranged within the third lens group or adjacent thereto in view of lessening the variation of aberrations by the movable lens groups and maintaining both of the values of the diameters of the first and fourth lens groups in good balance.

Although the zoom lens the present invention aims at is accomplished by the foregoing construction and arrangement, it is further preferred on aberration correction that the first lens group is constructed so as to have at least two positive lenses and one negative lens, the second lens group to have at least one positive lens and two negative lenses, the third lens group to have at least one positive and one negative lenses, and the fourth lens to have at least one positive and one negative lenses.

By this, the chromatic aberration is well corrected in each lens group. Also, in the first lens group, the spherical aberration on the telephoto side and, in the second lens group, the astigmatism and distortion on the wide angle side, are corrected well.

Further, in the present invention, to achieve a lessening of the variation of aberrations with variation of the magnification and minimization of the size of the entire lens system, it is good to design so as to satisfy the following conditions:

$$0.7 < |f_2/f_W| < 2.1 \quad (1)$$

$$1.2 < f_4/f_W < 4.0 \quad (2)$$

$$1.2 < |f_4/f_2| < 3.6 \quad (3)$$

$$0.72 < f_1/f_3 < 2.9 \quad (4)$$

$$1.8 < f_3/f_W < 4.2 \quad (5)$$

where $f_i$ is the focal length of the i-th lens group (i=1, 2, 3, 4), and $f_W$ is the focal length of the entire system at the wide angle end.

The inequalities of condition (1) concern with the refractive power of the second lens group. When the refractive power of the second lens group becomes strong beyond the lower limit, though it is desirable for minimization of the size of the lens system, the Petzval sum increases to the negative direction so that the curvature of field becomes large. Also, when the refractive power of the second lens group becomes weak beyond the upper limit, though the variation of aberrations with variation of the magnification decreases, the amount of movement for obtaining the prescribed zoom ratio must be increased. Hence the total length of the lens becomes long.

The inequalities of condition (2) concern with the refractive power of the fourth lens group. When the refractive power of the fourth lens group becomes strong beyond the lower limit, the on-axis spherical aberration on the wide angle side becomes under-corrected, and large outward coma is produced over the entire range of variation of the magnification. Also, when the refractive power of the fourth lens group becomes weak beyond the upper limit, the amount of movement that the variation of the magnification accompanies becomes large so that the total length of the lens increases and the variation of aberrations when focusing comes to increase.

The inequalities of condition (3) concern with the ratio of the refractive powers of the second and fourth lens groups. When the refractive power of the fourth lens group becomes too strong beyond the lower limit, it becomes difficult to well correct the variation of aberrations when varying the magnification. Conversely when the refractive power of the fourth lens group becomes too weak beyond the upper limit, the amount of movement increases, and the back focus becomes longer than necessary, so that the optical total length from the first lens group to the image plane becomes too long. Hence it is not favourable.

The inequalities of condition (4) concern with the refractive power ratio of the first and third lens groups. When the refractive power of the first lens group becomes too strong beyond the lower limit, the on-axis aberrations on the telephoto side tend to be under-corrected. Also, when the refractive power of the first lens group becomes too weak beyond the upper limit, the spacing between the first and third lens groups becomes too wide in relation to the amount of movement of the second lens group, and an unnecessary space is produced.

The inequalities of condition (5) concern with the refractive power of the third lens group. When the refractive power of the third lens group becomes strong beyond the lower limit, the spherical aberration on the wide angle side tends to be under-corrected. Further, the refractive power of the fourth lens group must be weakened. In accompaniment with this, the amount of movement of the fourth lens group comes to increase. Also, when the refractive power of the third lens group becomes too weak beyond the upper limit, the spherical aberration on the wide angle side tends to be over-corrected.

Numerical examples of the embodiment of the invention are next shown. In these examples, Ri is the radius of curvature of the i-th lens surface counting from the front, Di is the i-th lens thickness or air separation counting from the front, and Ni and vi are respectively the refractive index and Abbe number of the glass of the i-th lens element counting from the front. Also, in Table 1 there are shown the focal lengths of the individual lens groups in each example.

Numerical example 1

-continued

|   | Ri | Di | Ni | vi |
|---|---|---|---|---|
| 1 | 136.36 | 2.0 | 1.80518 | 25.4 |
| 2 | 39.81 | 7.6 | 1.60311 | 60.7 |
| 3 | −90.12 | 0.1 | 1. | |
| 4 | 26.50 | 4.5 | 1.69680 | 55.5 |
| 5 | 61.46 | 11. | 1. | |
| 6 | 70.26 | 0.9 | 1.77250 | 49.6 |
| 7 | 11.38 | 3.6 | 1. | |
| 8 | −15.15 | 0.9 | 1.73500 | 49.8 |
| 9 | 17.37 | 3.2 | 1.84666 | 23.9 |
| 10 | −52.64 | 12 | 1. | |
| 11 | Stop | 2.1 | 1. | |
| 12 | −67.81 | 1.9 | 1.74400 | 44.7 |
| 13 | −41.04 | 0.1 | 1. | |
| 14 | 54.68 | 5.0 | 1.55963 | 61.2 |
| 15 | −13.47 | 1.0 | 1.75520 | 27.5 |
| 16 | −55.70 | 0.2 | 1. | |
| 17 | 20.95 | 2.9 | 1.72916 | 54.7 |
| 18 | 60.51 | 13 | 1. | |
| 19 | 20.27 | 1.0 | 1.84666 | 23.9 |
| 20 | 12.47 | 2.4 | 1. | |
| 21 | −241.54 | 2.9 | 1.48749 | 70.2 |
| 22 | −28.01 | 0.1 | 1. | |
| 23 | 14.49 | 4.2 | 1.69680 | 55.5 |
| 24 | −305.46 | 14 | 1. | |
| 25 | ∞ | 5.0 | 1.51633 | 64.1 |
| 26 | ∞ | | 1. | |

| | f = 7.946 | f = 47.373 |
|---|---|---|
| 11 | 1.33 | 22.33 |
| 12 | 25.00 | 4.00 |
| 13 | 8.20 | 10.78 |
| 14 | 5.00 | 2.41 |

$S_K = 3.7$

Numerial example 2

|   | Ri | Di | Ni | vi |
|---|---|---|---|---|
| 1 | 127.43 | 2.0 | 1.80518 | 25.4 |
| 2 | 39.78 | 7.6 | 1.60311 | 60.7 |
| 3 | −89.19 | 0.1 | 1. | |
| 4 | 26.44 | 5.6 | 1.69680 | 55.5 |
| 5 | 57.17 | 11 | 1. | |
| 6 | 121.77 | 0.9 | 1.77250 | 49.6 |
| 7 | 11.94 | 3.4 | 1. | |
| 8 | −16.55 | 0.9 | 1.73500 | 49.8 |
| 9 | 16.49 | 3.4 | 1.84666 | 23.9 |
| 10 | −63.04 | 12 | 1. | |
| 11 | −61.53 | 1.9 | 1.72600 | 53.5 |
| 12 | −35.59 | 1.5 | 1. | |
| 13 | Stop | 1.5 | 1. | |
| 14 | 58.78 | 5.0 | 1.55963 | 61.2 |
| 15 | −13.53 | 1.0 | 1.75520 | 27.5 |
| 16 | −67.37 | 0.1 | 1. | |
| 17 | 22.27 | 2.9 | 1.74400 | 44.7 |
| 18 | 82.01 | 13 | 1. | |
| 19 | 22.11 | 1.0 | 1.84666 | 23.9 |
| 20 | 13.24 | 2.4 | 1. | |
| 21 | −213.40 | 2.9 | 1.48749 | 70.2 |
| 22 | −26.98 | 0.1 | 1. | |
| 23 | 15.35 | 4.2 | 1.69680 | 55.5 |
| 24 | −313.67 | 14 | 1. | |
| 25 | ∞ | 5.5 | 1.51633 | 64.1 |
| 26 | ∞ | | 1. | |

| | f = 8.780 | f = 51.252 |
|---|---|---|
| 11 | 0.90 | 21.40 |
| 12 | 23.00 | 2.50 |
| 13 | 8.20 | 11.35 |
| 14 | 5.00 | 1.84 |

$S_K = 4.403$

Numerical example 3

|   | Ri | Di | Ni | vi |
|---|---|---|---|---|
| 1 | 139.84 | 2.0 | 1.80518 | 25.4 |
| 2 | 40.50 | 7.6 | 1.60311 | 60.7 |
| 3 | −91.03 | 0.1 | 1. | |
| 4 | 25.60 | 4.5 | 1.69680 | 55.5 |
| 5 | 56.91 | 11 | 1. | |
| 6 | 119.98 | 0.9 | 1.77250 | 49.6 |
| 7 | 11.72 | 3.9 | 1. | |
| 8 | −16.04 | 0.9 | 1.73500 | 49.8 |
| 9 | 21.35 | 3.2 | 1.84666 | 23.9 |
| 10 | −49.21 | 12 | 1. | |
| 11 | Stop | 2.1 | 1. | |
| 12 | 40.88 | 1.9 | 1.74400 | 44.7 |
| 13 | −303.19 | 0.1 | 1. | |
| 14 | 111.74 | 4.2 | 1.55963 | 61.2 |
| 15 | −13.67 | 1.0 | 1.75520 | 27.5 |
| 16 | −42.13 | 0.2 | 1. | |
| 17 | 29.20 | 1.9 | 1.72916 | 54.7 |
| 18 | 42.21 | 13 | 1. | |
| 19 | 30.40 | 0.8 | 1.74077 | 27.8 |
| 20 | 11.04 | 4.5 | 1.55963 | 61.2 |
| 21 | −39.91 | 0.1 | 1. | |
| 22 | 16.81 | 3.2 | 1.51633 | 64.1 |
| 23 | 87.27 | 14 | 1. | |
| 24 | ∞ | 5.0 | 1.51633 | 64.1 |
| 25 | ∞ | | 1. | |

| | f = 7.938 | f = 45.427 |
|---|---|---|
| 11 | 1.35 | 22.35 |
| 12 | 25.00 | 4.00 |
| 13 | 8.20 | 10.45 |
| 14 | 5.00 | 2.74 |

$S_K = 2.887$

Numerical example 4

|   | Ri | Di | Ni | vi |
|---|---|---|---|---|
| 1 | 135.73 | 2.0 | 1.80518 | 25.4 |
| 2 | 40.01 | 7.6 | 1.60311 | 60.7 |
| 3 | −103.49 | 0.1 | 1. | |
| 4 | 29.30 | 5.6 | 1.69680 | 55.5 |
| 5 | 89.72 | 11 | 1. | |
| 6 | 113.24 | 0.9 | 1.77250 | 49.6 |
| 7 | 12.34 | 3.1 | 1. | |
| 8 | −16.27 | 0.9 | 1.73500 | 49.8 |
| 9 | 17.02 | 3.4 | 1.84666 | 23.9 |
| 10 | −70.53 | 12 | 1. | |
| 11 | Stop | 2.1 | 1. | |
| 12 | 58.41 | 2.85 | 1.74400 | 44.7 |
| 13 | −154.83 | 3.1 | 1. | |
| 14 | −14.24 | 0.9 | 1.84666 | 23.9 |
| 15 | −22.49 | 0.1 | 1. | |
| 16 | 30.53 | 3.7 | 1.69680 | 55.5 |
| 17 | −67.12 | 13 | 1. | |
| 18 | 35.11 | 1.0 | 1.84666 | 23.9 |
| 19 | 16.00 | 2.8 | 1. | |
| 20 | 134.94 | 2.9 | 1.48749 | 70.2 |
| 21 | −26.20 | 0.1 | 1. | |
| 22 | 17.12 | 4.2 | 1.69680 | 55.5 |
| 23 | −959.83 | 14 | 1. | |
| 24 | ∞ | 5.5 | 1.51633 | 64.1 |
| 25 | ∞ | | 1. | |

| | f = 8.794 | f = 50.971 |
|---|---|---|
| 11 | 0.90 | 21.90 |
| 12 | 25.00 | 4.00 |
| 13 | 8.20 | 10.79 |
| 14 | 5.00 | 2.40 |

$S_K = 9.587$

Numerical example 5

|   | Ri | Di | Ni | vi |
|---|---|---|---|---|
| 1 | 134.55 | 1.80 | 1.80518 | 25.4 |
| 2 | 35.69 | 7.60 | 1.60311 | 60.7 |
| 3 | −91.53 | 0.10 | 1. | |
| 4 | 25.84 | 5.40 | 1.69680 | 55.5 |
| 5 | 76.47 | 11 | 1. | |
| 6 | 92.12 | 0.90 | 1.77250 | 49.6 |

-continued

| | | | | |
|---|---|---|---|---|
| 7 | 11.37 | 3.50 | 1. | |
| 8 | −13.51 | 0.85 | 1.73500 | 49.8 |
| 9 | 16.95 | 2.75 | 1.84666 | 23.9 |
| 10 | −62.80 | 12 | 1. | |
| 11 | Stop | 1.76 | 1. | |
| 12 | 66.51 | 3.20 | 1.74400 | 44.7 |
| 13 | −26.45 | 2.10 | 1. | |
| 14 | −13.62 | 0.90 | 1.84666 | 23.9 |
| 15 | −25.25 | 0.10 | 1. | |
| 16 | 95.64 | 4.40 | 1.69680 | 55.5 |
| 17 | −24.31 | 13 | 1. | |
| 18 | 50.44 | 0.90 | 1.84666 | 23.9 |
| 19 | 16.32 | 2.70 | 1. | |
| 20 | −642.63 | 2.50 | 1.48749 | 70.2 |
| 21 | −26.00 | 0.10 | 1. | |
| 22 | 15.93 | 4.20 | 1.72000 | 50.2 |
| 23 | −515.13 | 14 | 1. | |
| 24 | ∞ | 5.50 | 1.51633 | 64.1 |
| 25 | ∞ | | 1. | |

| | $f = 8.830$ | $f = 50.670$ |
|---|---|---|
| 11 | 0.67 | 19.37 |
| 12 | 20.62 | 1.92 |
| 13 | 8.75 | 10.94 |
| 14 | 5.00 | 2.81 |
| | $S_K = 5.104$ | |

Numerical example 6

| | Ri | Di | Ni | $\nu i$ |
|---|---|---|---|---|
| 1 | 202.83 | 1.8 | 1.80518 | 25.4 |
| 2 | 48.49 | 7.5 | 1.60311 | 60.7 |
| 3 | −108.71 | 0.1 | 1. | |
| 4 | 32.08 | 5.9 | 1.69680 | 55.5 |
| 5 | 111.86 | 11 | 1. | |
| 6 | −525.29 | 0.8 | 1.77250 | 49.6 |
| 7 | 17.44 | 3.6 | 1. | |
| 8 | −19.00 | 0.75 | 1.73500 | 49.8 |
| 9 | 22.96 | 3.0 | 1.84666 | 23.9 |
| 10 | −145.50 | 12 | 1. | |
| 11 | Stop | 1.2 | 1. | |
| 12 | −103.30 | 2.9 | 1.72916 | 54.7 |
| 13 | −32.99 | 2.6 | 1. | |
| 14 | −15.94 | 0.9 | 1.84666 | 23.9 |
| 15 | −19.96 | 0.1 | 1. | |
| 16 | 263.54 | 3.6 | 1.61800 | 63.4 |
| 17 | −36.52 | 13 | 1. | |
| 18 | 31.75 | 1.0 | 1.84666 | 23.9 |
| 19 | 17.71 | 0.5 | 1. | |
| 20 | 18.84 | 5.4 | 1.69680 | 55.5 |
| 21 | −63.85 | 14 | 1. | |
| 22 | ∞ | 5.5 | 1.51633 | 64.1 |
| 23 | ∞ | | 1. | |

| | $f = 14.269$ | $f = 64.176$ |
|---|---|---|
| 11 | 1.20 | 22.20 |
| 12 | 23.00 | 2.00 |
| 13 | 15.00 | 16.14 |
| 14 | 10.00 | 8.85 |
| | $S_K = 14.312$ | |

Numerical example 7

| | Ri | Di | Ni | $\nu i$ |
|---|---|---|---|---|
| 1 | 164.27 | 1.8 | 1.80518 | 25.4 |
| 2 | 45.42 | 7.2 | 1.60311 | 60.7 |
| 3 | −106.65 | 0.1 | 1. | |
| 4 | 31.99 | 5.4 | 1.69680 | 55.5 |
| 5 | 108.34 | 11 | 1. | |
| 6 | 144.42 | 0.8 | 1.77250 | 49.6 |
| 7 | 16.48 | 3.6 | 1. | |
| 8 | −18.24 | 0.75 | 1.73500 | 49.8 |
| 9 | 19.67 | 3.0 | 1.84666 | 23.9 |
| 10 | −322.61 | 12 | 1. | |
| 11 | Stop | 1.2 | 1. | |
| 12 | 53.65 | 3.7 | 1.61800 | 63.4 |
| 13 | −29.78 | 1.4 | 1. | |
| 14 | −17.99 | 0.9 | 1.84666 | 23.9 |
| 15 | −23.09 | 13 | 1. | |
| 16 | 26.59 | 1.0 | 1.84666 | 23.9 |
| 17 | 16.51 | 0.8 | 1. | |
| 18 | 18.73 | 4.5 | 1.69680 | 55.5 |
| 19 | −49.16 | 14 | 1. | |
| 20 | ∞ | 5.5 | 1.51633 | 64.1 |
| 21 | ∞ | | 1. | |

| | $f = 14.518$ | $f = 68.025$ |
|---|---|---|
| 11 | 1.2 | 22.20 |
| 12 | 23.0 | 2.00 |
| 13 | 15.0 | 18.43 |
| 14 | 10.0 | 6.56 |
| | $S_K = 14.167$ | |

Numerical example 8

| | Ri | Di | Ni | $\nu i$ |
|---|---|---|---|---|
| 1 | 419.63 | 2.5 | 1.80518 | 25.4 |
| 2 | 74.44 | 3.2 | 1. | |
| 3 | 352.74 | 7.4 | 1.43387 | 95.1 |
| 4 | −64.63 | 0.1 | 1. | |
| 5 | 39.51 | 7.9 | 1.49700 | 81.6 |
| 6 | −461.44 | 0.1 | 1. | |
| 7 | 27.47 | 2.9 | 1.69680 | 55.5 |
| 8 | 39.14 | 11 | 1. | |
| 9 | 23.61 | 0.95 | 1.88300 | 40.8 |
| 10 | 14.08 | 3.18 | 1. | |
| 11 | −46.19 | 0.70 | 1.80400 | 46.6 |
| 12 | 26.94 | 3.15 | 1. | |
| 13 | −10.82 | 0.70 | 1.77250 | 49.6 |
| 14 | −220.28 | 2.70 | 1.92286 | 21.3 |
| 15 | −17.37 | 12 | 1. | |
| 16 | 324.22 | 1.9 | 1.72600 | 53.5 |
| 17 | −87.01 | 1.5 | 1. | |
| 18 | Stop | 2.9 | 1. | |
| 19 | −227.37 | 5.4 | 1.55963 | 61.2 |
| 20 | −11.91 | 1.0 | 1.75520 | 27.5 |
| 21 | −37.99 | 0.1 | 1. | |
| 22 | 22.31 | 2.9 | 1.74400 | 44.7 |
| 23 | 133.72 | 13 | 1. | |
| 24 | 21.45 | 1.0 | 1.84666 | 22.9 |
| 25 | 13.14 | 2.4 | 1. | |
| 26 | −147.37 | 2.9 | 1.48749 | 70.2 |
| 27 | −23.71 | 0.1 | 1. | |
| 28 | 13.66 | 4.2 | 1.69680 | 55.5 |
| 29 | 91.27 | 14 | 1. | |
| 30 | ∞ | 5.50 | 1.51633 | 64.1 |
| 31 | ∞ | | 1. | |

| | $f = 79.28$ | $f = 40.761$ |
|---|---|---|
| 11 | 1.5 | 22.00 |
| 12 | 23.0 | 2.50 |
| 13 | 8.2 | 9.21 |
| 14 | 5.0 | 3.98 |
| | $S_K = 3.916$ | |

Numerical example 9

| | Ri | Di | Ni | $\nu i$ |
|---|---|---|---|---|
| 1 | 157.87 | 1.9 | 1.80518 | 25.4 |
| 2 | 58.68 | 3.2 | 1. | |
| 3 | 192.60 | 6.7 | 1.43387 | 95.1 |
| 4 | −63.04 | 0.1 | 1. | |
| 5 | 33.22 | 7.4 | 1.49700 | 81.6 |
| 6 | 1718.55 | 0.1 | 1. | |
| 7 | 28.73 | 2.9 | 1.69680 | 55.5 |
| 8 | 36.51 | 11 | 1. | |
| 9 | 55.35 | 0.9 | 1.77250 | 49.6 |
| 10 | 11.70 | 3.8 | 1. | |
| 11 | −14.15 | 0.9 | 1.73500 | 49.8 |
| 12 | 16.63 | 2.9 | 1.84666 | 23.9 |
| 13 | −55.41 | 12 | 1. | |
| 14 | 50.44 | 1.9 | 1.72600 | 53.5 |
| 15 | 908.88 | 1.5 | 1. | |
| 16 | Stop | 2.9 | 1. | |

-continued

| | | | | |
|---|---|---|---|---|
| 17 | −20.83 | 5.4 | 1.55963 | 61.2 |
| 18 | −9.27 | 1.0 | 1.75520 | 27.5 |
| 19 | −19.80 | 0.1 | 1. | |
| 20 | 22.15 | 2.9 | 1.74400 | 44.7 |
| 21 | 194.27 | 13 | 1. | |
| 22 | 20.43 | 1.0 | 1.84666 | 23.9 |
| 23 | 12.93 | 2.4 | 1. | |
| 24 | ∞ | 2.9 | 1.48749 | 70.2 |
| 25 | −19.53 | 0.1 | 1. | |
| 26 | 12.00 | 4.2 | 1.69680 | 55.5 |
| 27 | 28.65 | 14 | 1. | |
| 28 | ∞ | 5.5 | 1.51633 | 64.1 |
| 29 | ∞ | | 1. | |

| f = 7.761 | | f = 40.541 | |
|---|---|---|---|
| 11 | 1.5 | | 22.0 |
| 12 | 23.0 | | 2.5 |
| 13 | 8.2 | | 9.3 |
| 14 | 5.0 | | 3.8 |
| | $S_K = 3.990$ | | |

TABLE 1

| Numerical example | focal length | | | |
|---|---|---|---|---|
| | $f_1$ | $f_2$ | $f_3$ | $f_4$ |
| 1 | 42.964 | −12.000 | 25.399 | 21.341 |
| 2 | 42.964 | −12.000 | 26.055 | 22.383 |
| 3 | 42.964 | −12.000 | 27.367 | 21.660 |
| 4 | 42.964 | −12.000 | 34.641 | 23.538 |
| 5 | 39.105 | −10.314 | 22.547 | 25.473 |
| 6 | 46.798 | −12.955 | 40.958 | 37.471 |
| 7 | 45.691 | −12.922 | 44.882 | 31.251 |
| 8 | 44.000 | −12.000 | 26.596 | 22.893 |
| 9 | 44.000 | −12.000 | 28.316 | 22.448 |

Though, in the foregoing embodiment, the fourth lens group includes lenses having a positive refractive power and a negative refractive power, another embodiment in which the fourth lens group is constructed in bi-convex form only with lenses having positive refractive powers is next described.

The fourth lens group is constructed so as to have at least one positive lenses whose both surfaces are convex, and variation of aberrations, particularly spherical aberration, with zooming is well corrected.

For note, by the first and third lens groups, while adjusting the various paraxial variables such as the focal length and image angle of the entire system and the back focus, the variation of aberrations by the movable lens groups is also well corrected. Also, in this embodiment, it is preferred that the diaphragm is arranged within the third lens group or adjacent thereto, for the variation of aberrations by the movable lens groups is minimized, and both of the values of the diameters of the first and fourth lens units are maintained in good balance.

Though a zoom lens the present invention aims at can be accomplished by the construction and arrangement described above, it is further preferred on aberration correction that the positive lenses of the above-described fourth lens group are made up by glasses whose Abbe numbers are not less than 50 with their mean value of not less than 60, and it is good that the entire system is constructed so as to satisfy the following conditions:

$$0.68 < |f_2/fw| < 1.51 \quad (1)$$

$$1.06 < f_4/fw < 2.4 \quad (2)$$

$$1 < |f_4/f_2| < 2.1 \quad (3)$$

$$1 < f_3/f_1 < 2.1 \quad (4)$$

$$3.1 < f_3/fw < 6.9 \quad (5)$$

where fi is the focal length of the i-th lens group, and fw is the shortest focal length of the entire system.

For note, on the inequalities of condition (1), (2), (3) and (5), similar effects to those described above are produced. So their explanation is omitted.

The inequalities of condition (4) concern with the refractive power ratio of the first and third lens groups. When the refractive power of the first lens group becomes too strong beyond the upper limit, the on-axis aberrations on the telephoto side tend to be under-corrected. Also, when the refractive power of the first lens group becomes too weak beyond the lower limit, the spacing between the first and third lens groups becomes too wide in relation to the amount of movement of the second lens group so that an unnecessary space comes to arise.

Next, numerical examples of the embodiment of the invention are shown. As to the symbols, the same as has been described before holds.

Numerical example 10

F = 8.68 ~ 27.19    FNO = 1:2.0    2ω = 49.5* ~ 16.7*

| | | | |
|---|---|---|---|
| R1 = 51.23 | D1 = 1.30 | N1 = 1.80518 | ν1 = 25.4 |
| R2 = 27.35 | D2 = 5.50 | N1 = 1.62299 | ν2 = 58.2 |
| R3 = −861.72 | D3 = 0.15 | | |
| R4 = 22.68 | D4 = 4.10 | N1 = 1.69680 | ν3 = 55.5 |
| R5 = 84.50 | D5 = 0.50 ~ 11.75 | | |
| R6 = 21.79 | D6 = 0.70 | N4 = 1.78590 | ν4 = 44.2 |
| R7 = 7.72 | D7 = 2.70 | | |
| R8 = −13.76 | D8 = 0.60 | N5 = 1.70154 | ν5 = 41.2 |
| R9 = 9.63 | D9 = 2.90 | N6 = 1.84666 | ν6 = 23.9 |
| R10 = −167.82 | D10 = 14.68 ~ 3.42 | | |
| R11 = −5.79 | D11 = 0.65 | N7 = 1.59270 | ν7 = 35.3 |
| R12 = −9.55 | D12 = 0.15 | | |
| R13 = −15.85 | D13 = 1.80 | N8 = 1.60311 | ν8 = 60.7 |
| R14 = −10.38 | D14 = 1.00 | | |
| R15 = Stop | D15 = 1.50 | | |
| R16 = 92.29 | D16 = 2.70 | | |
| R17 = −20.46 | D17 = 0.15 | | |
| R18 = 14.68 | D18 = 2.70 | N10 = 1.51742 | ν10 = 52.4 |
| R19 = −170.76 | D19 = 0.68 | | |
| R20 = 17.06 | D20 = 0.70 | N11 = 1.84666 | ν11 = 23.9 |
| R21 = 7.69 | D21 = 4.85 ~ 6.12 | | |
| R22 = 12.30 | D22 = 2.70 | N12 = 1.48749 | ν12 = 70.2 |
| R23 = −19.16 | D23 = 2.50 ~ 1.23 | | |
| R24 = ∞ | D24 = 5.50 | N13 = 1.51633 | ν13 = 64.1 |
| R25 = ∞ | | | |

Numerical example 11

F = 10.18 ~ 29.82    FNO = 1:1.8    2ω = 42.9* ~ 6.9*

| | | | |
|---|---|---|---|
| R1 = 98.56 | D1 = 1.30 | N1 = 1.80518 | ν1 = 25.4 |
| R2 = 26.69 | D2 = 5.50 | N2 = 1.62299 | ν2 = 58.2 |
| R3 = −73.06 | D3 = 0.15 | | |
| R4 = 21.77 | D4 = 4.10 | N3 = 1.62374 | ν3 = 47.1 |
| R5 = 92.24 | D5 = 0.50 ~ 11.75 | | |
| R6 = 119.11 | D6 = 0.70 | N4 = 1.78590 | ν4 = 44.2 |
| R7 = 9.66 | D7 = 2.80 | | |
| R8 = −12.35 | D8 = 0.60 | N5 = 1.70154 | ν5 = 41.2 |
| R9 = 11.73 | D9 = 2.40 | N6 = 1.84666 | ν6 = 23.9 |
| R10 = −41.31 | D10 = 14.68 ~ 3.42 | | |
| R11 = −7.55 | D11 = 0.65 | N7 = 1.71300 | ν7 = 53.8 |
| R12 = −10.09 | D12 = 0.15 | | |

-continued

Numerical example 11
F = 10.18 ~ 29.82  FNO = 1:1.8  2ω = 42.9* ~ 6.9*

| | | | |
|---|---|---|---|
| R13 = −24.64 | D13 = 2.10 | N8 = 1.59270 | ν8 = 35.2 |
| R14 = −13.45 | D14 = 1.00 | | |
| R15 = Stop | D15 = 1.50 | | |
| R16 = 17.31 | D16 = 4.00 | N9 = 1.62230 | ν9 = 53.2 |
| R17 = −52.11 | D17 = 0.15 | | |
| R18 = 14.97 | D18 = 2.90 | N10 = 1.51742 | ν10 = 52.4 |
| R19 = 119.36 | D19 = 0.68 | | |
| R20 = −86.49 | D20 = 0.70 | N11 = 1.84666 | ν11 = 23.9 |
| R21 = 11.30 | D21 = 4.85 ~ 5.48 | | |
| R22 = 48.39 | D22 = 2.70 | N12 = 1.51633 | ν12 = 64.1 |
| R23 = −23.00 | D23 = 0.15 | | |
| R24 = 15.73 | D24 = 2.40 | N13 = 1.48749 | ν13 = 70.2 |
| R25 = −416.08 | D25 = 2.50 ~ 1.88 | | |
| R26 = ∞ | D26 = 5.50 | N14 = 1.51633 | ν14 = 64.1 |
| R27 = ∞ | | | |

Numerical example 12
F = 10.18 ~ 29.82  FNO = 1:1.6  2ω = 42.9* ~ 15.3*

| | | | |
|---|---|---|---|
| R1 = 79.56 | D1 = 1.30 | N1 = 1.80518 | ν1 = 25.4 |
| R2 = 25.86 | D2 = 5.50 | N2 = 1.62299 | ν2 = 58.2 |
| R3 = −79.75 | D3 = 0.15 | | |
| R4 = 22.44 | D4 = 4.10 | N3 = 1.62374 | ν3 = 47.1 |
| R5 = 92.67 | D5 = 0.30 ~ 11.55 | | |
| R6 = 81.25 | D6 = 0.70 | N4 = 1.78590 | ν4 = 44.2 |
| R7 = 9.33 | D7 = 2.80 | | |
| R8 = −11.43 | D8 = 0.60 | N5 = 1.70154 | ν5 = 41.2 |
| R9 = 11.80 | D9 = 2.40 | N6 = 1.84666 | ν6 = 23.9 |
| R10 = −35.32 | D10 = 14.73 ~ 3.48 | | |
| R11 = −7.24 | D11 = 0.65 | N7 = 1.71300 | ν7 = 53.8 |
| R12 = −9.30 | D12 = 0.15 | | |
| R13 = −21.27 | D13 = 2.10 | N8 = 1.59270 | ν8 = 35.2 |
| R14 = −12.35 | D14 = 1.00 | | |
| R15 = Stop | D15 = 1.50 | | |
| R16 = 16.80 | D16 = 4.00 | N9 = 1.62230 | ν9 = 53.2 |
| R17 = −81.10 | D17 = 0.15 | | |
| R18 = 17.04 | D18 = 2.90 | N10 = 1.51742 | ν10 = 52.4 |
| R19 = −216.54 | D19 = 0.68 | | |
| R20 = −64.69 | D20 = 0.70 | N11 = 1.84666 | ν11 = 23.9 |
| R21 = 11.70 | D21 = 4.73 ~ 5.36 | | |
| R22 = 47.83 | D22 = 2.70 | N12 = 1.51633 | ν12 = 64.1 |
| R23 = −23.75 | D23 = 0.15 | | |
| R24 = 16.08 | D24 = 2.40 | N13 = 1.48749 | ν13 = 70.2 |
| R25 = −281.01 | D25 = 2.50 ~ 1.88 | | |
| R26 = ∞ | D26 = 5.50 | N14 = 1.51633 | ν14 = 64.1 |
| R27 = ∞ | | | |

TABLE 2

| Numerical example | focal length | | | |
|---|---|---|---|---|
| | $f_1$ | $f_2$ | $f_3$ | $f_4$ |
| 10 | 31.15 | −10.09 | 46.07 | 15.81 |
| 11 | 31.16 | −10.17 | 40.07 | 15.81 |
| 12 | 31.15 | −10.18 | 45.87 | 15.82 |

According to the present invention, a zoom lens of high magnification range with utilization of the rear focus method which enables a minimization of the size of the entire system in such a way that good correction of aberrations is achieved.

What is claimed is:

1. A zoom lens comprising, from front to rear, a first lens group of positive refractive power, a second lens group of negative refractive power, a third lens group of positive refractive power and a fourth lens group of positive refractive power, wherein said first and said third lens groups are made fixed, said second lens group is made to move in one direction to perform variation of magnification, said fourth lens group is made to move so as to compensate for the shift of an image plane the variation of magnification accompanies, and focusing is performed by moving the entire fourth lens group.

2. A zoom lens according to claim 1, wherein said first lens group comprises at least two positive lenses and one negative lens, said second lens group comprises one positive lens and at least two negative lenses, said third lens group comprises positive and negative lenses and at least one of each, and said fourth lens group comprises at least one positive lens and one negative lens.

3. A zoom lens according to claim 2, satisfying the following conditions:

$$0.7 < |f_2/f_w| < 2.1$$

$$1.2 < f_4/f_w < 4.0$$

$$1.2 < |f_4/f_2| < 3.6$$

$$0.72 < f_1/f_3 < 2.9$$

$$1.8 < f_3/f_w < 4.2$$

wherein fi is the local length of said i-th lens group (i=1, 2, 3, 4) and $f_w$ is the shortest focal length of the entire system.

4. A zoom lens comprising, from front to rear, a first lens group of positive refractive, a second lens group of negative refractive power, a third lens group of positive refractive power and a fourth group of positive refractive power, said fourth lens group further comprising a biconvex lens, said first and said third lens group being fixed, said second lens group being fixed, said second lens group being moved in one direction to vary the image magnification, said fourth lens group being moved so as to compensate for the shirt of an image plane the variation of the image magnification accompanies, and said fourth lens group being made to move to effect focusing.

5. A zoom lens according to claim 4, wherein said fourth lens group further comprises positive lenses that are made from glasses having Abbe numbers of not less than 50 with a mean value of not less than 60, and said zoom lens satisfies the following conditions:

$$0.68 < |f_2/fw| < 1.51$$

$$1.06 < f_4/fw < 2.4$$

$$1 < |f_4/f_2| < 2.1$$

$$1 < f_3/f_1 < 2.1$$

$$3.1 < f_3/fw < 6.9$$

where fi is the focal length of said i-th lens group (i=1, 2, 3, 4) and fw is the shortest focal length of the entire system.

6. A zoom lens comprising, front to rear, a first lens group of positive refractive power, a second lens group of negative refractive power, a third lens group of positive refractive power and a fourth lens group of positive refractive power, said fourth lens comprising two biconvex lenses, said first and said third lens group being fixed, said second lens group being moved in one direction to vary the image magnification, said fourth lens group being moved so as to compensate for the shirt of an image plane the variation of the image magnification accompanies, and said fourth lens group being made to move to effect focusing.

* * * * *